(12) United States Patent
Adiseshan

(10) Patent No.: US 7,733,326 B1
(45) Date of Patent: Jun. 8, 2010

(54) COMBINATION MOUSE, PEN-INPUT AND PEN-COMPUTER DEVICE

(76) Inventor: Prakash Adiseshan, 9950 Nethy Bridge Ct., Bristow, VA (US) 20136

( * ) Notice: Subject to any disclaimer, the term of this patent is extended or adjusted under 35 U.S.C. 154(b) by 1253 days.

(21) Appl. No.: 11/192,908

(22) Filed: Jul. 29, 2005

Related U.S. Application Data

(60) Provisional application No. 60/598,910, filed on Aug. 2, 2004.

(51) Int. Cl.
*G09G 5/00* (2006.01)

(52) U.S. Cl. ........................ 345/156; 345/157; 345/158; 345/160; 345/163; 345/173

(58) Field of Classification Search .......... 345/156–179
See application file for complete search history.

(56) References Cited

U.S. PATENT DOCUMENTS

| | | | |
|---|---|---|---|
| 4,922,236 A | 5/1990 | Heady |
| 5,291,213 A | 3/1994 | Krauss |
| 5,706,026 A | 1/1998 | Kent |
| 6,043,807 A | 3/2000 | Carroll |
| 6,151,015 A | 11/2000 | Badyal |
| 6,229,102 B1 | 5/2001 | Sato |
| 6,262,719 B1 | 7/2001 | Bi |
| 6,498,604 B1 | 12/2002 | Jensen |
| 6,577,299 B1 | 6/2003 | Schiller |
| 6,625,314 B1 | 9/2003 | Okamoto |
| 6,633,282 B1 | 10/2003 | Monroe |
| 6,686,579 B2 | 2/2004 | Fagin |
| 6,703,570 B1 | 3/2004 | Russell |
| 6,747,599 B2 | 6/2004 | McEwan |
| 6,897,854 B2 | 5/2005 | Cho |
| 6,906,699 B1 | 6/2005 | Fahraeus et al. |
| 6,906,703 B2 | 6/2005 | Vablais |
| 2002/0044134 A1 | 4/2002 | Ericson |
| 2004/0140962 A1 | 7/2004 | Wang |

FOREIGN PATENT DOCUMENTS

| | | |
|---|---|---|
| WO | WO-9922338 | 5/1999 |
| WO | WO-03001358 | 1/2003 |
| WO | WO-2005010741 | 2/2005 |

*Primary Examiner*—Richard Hjerpe
*Assistant Examiner*—Leonid Shapiro

(57) ABSTRACT

An apparatus that can be used as a mouse device and as a pen device. The apparatus has modular configuration. It has four types of units: a sensor unit, a processor unit, a mouse converter unit and a pen attachment unit. The sensor unit may use an optical arrangement for detecting relative motion. The sensor unit and processor unit are used in mouse and pen device configurations. Mouse converter unit is a mouse-shape enclosure useful mainly when apparatus is employed for mouse-input. Pen attachment unit is actively employed when the apparatus is used as a pen device, but it can be made compact to fit into mouse converter unit when the apparatus is used as a mouse device. The pen attachment unit connects the sensor unit with any pen-shaped object, selectively coupling the motion of the object with the sensor unit. When the apparatus is used as a pen-device, the processor unit can be conveniently worn on hand thereby making the device highly portable. As a pen device, the apparatus can be used in pen-input mode to provide real-time input to a host device. It can also be used as a pen computer whereby input is processed and stored offline for future synchronization with the host device.

13 Claims, 19 Drawing Sheets

COMBINATION MOUSE, PEN-INPUT AND PEN-COMPUTER DEVICE

CROSS REFERENCE TO RELATED APPLICATIONS

This application claims the benefit of provisional patent application Ser. No. 60/598,910, filed 2004 Aug. 2 by the present inventor.

FEDERALLY SPONSORED RESEARCH

Not Applicable

SEQUENCE LISTING OR PROGRAM

Not Applicable

BACKGROUND OF THE INVENTION

1. Field of Invention

The present invention relates to an apparatus that can be used, as a computer mouse device and as an enabling device for turning ordinary pen-shaped objects into digital instruments, for the purposes of cursor control, inputting figures, symbols, characters and the like into a data processing device, such as a computer.

2. Prior Art

Conventionally, a keyboard, mouse, digitizer, light pen, and tablet, etc. have been used as an input apparatus employed in a computer apparatus or the like. There is a growing range of computing devices, from those that are small and portable to those that are bigger and remain on desktop. Ergonomic human interaction with computers is an important problem to be addressed, particularly with the growing variety of small devices.

There is a limitation on making a keyboard small-sized from the viewpoint of human interface, and the keyboard is not a practical input apparatus for a portable device. A conventional mouse device is made to be gripped by the hand and to be enclosed by the palm of the hand. The arrangement of sensing technology in a mouse device is typically proximal to the surface. Mouse usage is ubiquitous. Although mouse device can be made in a small-size and used as a pointing device, it is not suitable for inputting figures and characters, etc. into a data processor.

Since it is clumsy to use a keyboard along with a small portable device such as Personal Digital Assistant (PDA) or cellular phone, it is highly desirable to use a pen-shaped device with such small devices. For this reason, on many occasions, a pen-shaped input apparatus employing a tablet and pen have been adopted as the input apparatus for a portable device. The size of the tablet is small, especially in small portable devices, and this restriction does not allow providing pen-input with ease.

Use of tablet-based pen-input apparatus is not common in conventional desktop computer arrangement for several reasons. Even though larger tablets can be used on a desktop, such arrangements increase the price of the input accessories needed and also clutter the desktop.

To overcome the problem of tablet size, pen input apparatuses without relying on tablets have been developed. There are two kinds of such pen devices, based on their overall configuration. One type of devices is dedicated pen devices; they are dedicated in that they are manufactured in a specific pen size. The other type is pen "attachment" devices that can be attached to an external pen object; these devices can be made to accommodate different pen sizes.

Some of the dedicated pens allow ink flow for writing, whereas others do not. There are in general two classes of dedicated pen devices, based on the sensing technology employed. One class of sensing technologies places all the sensing mechanism contained within the pen (e.g. U.S. Pat. No. 6,229,102) whereas the other class involves external references where at least part of the sensing mechanism is placed remotely from the pen (e.g. U.S. Pat. No. 6,703,570).

Early attempts at dedicated pen devices, with self-contained sensing mechanism, relied on mechanical roller ball based arrangements wherein at least one ball at the tip of the pen is in contact with the writing surface (e.g. U.S. Pat. No. 5,291,213) and the rotation of the ball is electromechanically sensed to calculate relative motion. Optical means of detecting relative motion, based on patterns on the ball, are also known in digital pens (e.g. U.S. Pat. No. 6,498,604). Other attempts have used inertial sensors to calculate motion of tip of pen. Dedicated devices are typically offered in larger sizes that may not be comfortable to grip. When the dedicated pen devices involve ink flow, they can be cumbersome to maintain due to the need for customized ink reservoirs. These factors do not make such pen devices suitable for wide usage.

As stated earlier, dedicated pen devices that rely on external references are known. Many of those devices have used ultrasound and radio frequency technologies (e.g. U.S. Pat. No. 6,577,299). Some have employed optical technology which relies on special markings on writing surface that provide absolute coordinate information. These technologies are expensive in general and are appropriate for use in specific applications such as the use of digital pen in filling forms, in an office setting.

All these developments in dedicated digital pens have left a void in that these devices are neither practical to manufacture in a variety of suitable sizes and weights at a low cost, so that they can be used by a variety of users, nor do they enable the use of commonly used pen-shaped objects to provide digital input.

There are a couple of attachment type pen devices known in prior art. One of them, disclosed in U.S. 2004/179000, allows a pen to be inserted into the attachment, but it is bulky in nature. The other device, disclosed in U.S. Pat. No. 6,906,703, uses an attachment rigidly fixed to a pen and contains accelerometers to detect motion. Rigid attachment of accelerometers to a pen reduces the accuracy of detected motion due to the effects of gravity component on accelerometer signals. Further, in said U.S. Pat. No. 6,906,703, there is no means to distinguish between motion of pen on the surface and the motion of pen when it is not in contact with the surface.

In general, electronic hardware used in pen devices is more complicated than that used in mouse devices. This is because there are several components of motion that need to be accounted to accurately track pen movement. These motion components are: (i) motion of pen-tip on the surface, (ii) motion of pen tip away from the surface, but on a plane parallel to the surface, (ii) static inclination angle of pen with respect to the normal direction of the surface and (iii) dynamic inclination changes of the pen with respect to the normal direction of the surface.

In other words, among different users and based on user's style of gripping the pen, there can be variations in (i) the inclination of pen with respect to surface at the beginning of pen use and subsequent changes during pen use, and (ii) the amount by which the pen is lifted off the surface. These factors impact the accuracy of relative motion sensing means in pen devices.

It can be appreciated that although there are some similarities between sensor technologies used in mouse devices and pen devices, the complicated nature of pen motion necessitates additional sensors for accurate tracking of pen motion. In general, this makes the digital pen devices bulkier and more expensive.

For small portable devices, the need to have a low cost digital pen that is independent of tablet is crucial. In providing pen input to small devices such as PDA or cellular phone, it is much easier to write on a nearby surface than on a small tablet on the device. This will allow ergonomic pen interaction. But such devices are not commercially realized.

For large computing devices, such as desktop computers, it is important to allow pen input albeit at lower cost and without cluttering the desktop. For desktop computers, in some cases, it is preferable to be able to switch between the mouse-input and pen-input with ease.

In prior art, pen devices are known to be used for real-time (pen-input) or for offline (pen-computer) input purposes. A device that can be used both as a pen-input device and pen-computer device is not commonly available.

Not surprisingly, compared with digital pen devices, the computer mouse devices have achieved remarkable success while being available at a low cost. Particularly, the accuracy of computer mouse has increased with the introduction of optical sensing technology. In conventional mouse devices, the motion sensing means and related electronics are light-weight in nature; it is usually the shell of the mouse device that is made heavier to provide appropriate feel for the user.

Although the accuracy and ease of use of the mouse devices have vastly improved, the function performed by the mouse device has been restricted to cursor control, for several decades. Several mouse configurations are known for employing the mouse device for uses other than cursor control, but these modifications are not commercially available.

It is clear that there is a need for using both the mouse shaped device and low-cost ergonomic pen-shaped device (independent of tablet) in routine computer interaction. One possibility for having both mouse and pen function is to have a mouse device and a pen device separately connected to a host device, functioning independent of each other.

A port for a mouse device is commonly available in computers whereas an additional pen device would require use of another port. Also, the number of digital devices that need to be connected to a host device has increased in recent years. On the one hand it is difficult to have a dedicated port available for each device and on the other hand it becomes a chore to plug peripheral devices in and out, in order to share ports. So it is preferable to make devices that perform more than one function while sharing the connection to the host device. This will also lead to reduction in the cost of input accessories.

Combining mouse device functions and pen device functions in one apparatus have been attempted. One such attempt is a pen-shaped device, sold by a company Finger Systems of Korea, that can be used to mimic mouse-like functionality. One limitation with such device is that it is difficult to provide mouse-input using a pen-shaped device. Another attempt in prior art, disclosed in WO2005010741, has a pen that has a back end shaped like a mouse. This makes the pen heavier at the top and bulkier to handle.

OBJECTS AND ADVANTAGES

Accordingly, several objects and advantages of my invention are as follows.

A primary object of the invention is to provide a modularly designed apparatus that can be operated as a mouse device and as a pen device.

It is an object of the invention to configure it as a pen device without the aid of a tablet or a touch screen.

Another object of the invention is to allow any pen-shaped object to be employed for pen-based computer interaction.

It is an object of the invention to allow the attachment of a pen object to the apparatus, at a convenient inclination with respect to the surface.

It is another object of the invention to de-couple navigational motion of pen tip away from surface, so as to keep the sensor unit attached to a pen-object while remaining proximal to the surface.

Yet another object of the invention is to allow real-time pen-input.

Another object of the invention is to perform pen-computer functions.

It is an object of the invention to process and store user input in an efficient manner while operating as a pen computer.

It is another object of the invention is to have a compact configuration so it can be used as a pen device in mobile applications.

Yet another object of the invention is to allow part of the device to be worn by the user.

It is yet another object of the invention to employ low-cost sensor technology, found in mouse devices, for use in pen devices.

It is another object of the invention to share the same communications resource when the invention is employed as a mouse device or as a pen device.

SUMMARY

In accordance with the present invention a modularly designed apparatus comprising one or more sensor units, a processor unit, a pen attachment unit and a mouse converter unit can be configured for use as a mouse device and a pen device.

An optical sensor arrangement may be used in the sensor unit since optical technology is of low-cost and has proven to be highly accurate in mouse devices. The pen attachment unit enables a sensor unit to be attached to a pen-shaped object such that the motion of the pen tip, on a plane parallel to a writing surface, is coupled to the movement of the sensor unit.

Unlike other pen devices, in the present invention, when the pen tip is lifted off the surface a slider arrangement in the pen attachment unit comes into operation and allows the sensor unit to be unaffected by the motion component that is in a direction along the normal of the writing surface.

So the pen attachment unit allows use of low-cost mouse sensor technology for use in a pen device. This is a significant advantage since this can provide the much needed freedom from tablet restrictions when using pen interactions with a small portable device without increasing cost significantly.

The present invention paves way for any pen-shaped object to be used to provide electronic input. This is advantageous since it will suit many different computer applications across a variety of computing devices. Enabling digital input using any pen-shaped object helps accommodate a variety of styles of user grip and hand motion.

This invention also makes possible a low-cost combination device that can be configured such that the mouse and pen operations co-exist in an apparatus and share the same resources in connecting to a host device. Although the apparatus is a combination device, the pen device disclosed can be manufactured all by itself and used. The potential uses of such low-cost, lightweight, portable pen devices are too numerous to be listed exhaustively.

DETAILED DESCRIPTION

Preferred Embodiment

The disclosed invention consists of four types of units (FIGS. 1-8): (i) a sensor unit, (ii) a pen-attachment unit, (iii) a mouse-converter unit, and (iv) a processor unit. The flexible configuration of these four types of units allows the use of the device in the three different modes: mouse, pen-input and pen-computer.

Each of the units is fully described, followed by a description of how they are configured to realize each of the three stated modes.

Figure 1A:
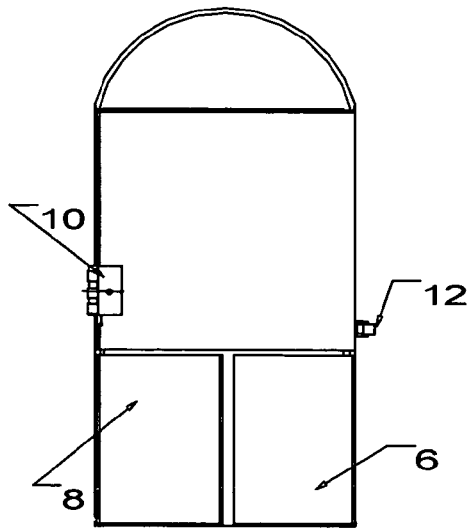
FIGS. 1A to 1D show the various aspects of mouse converter unit with the top cover closed.
Figure 1B:
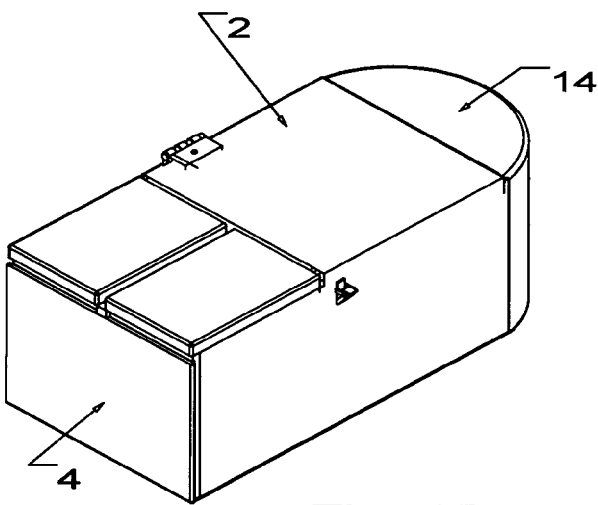
Figure 1C:
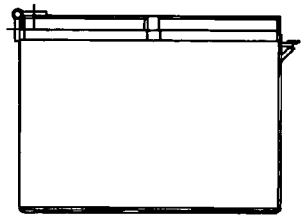
Figure 1D:
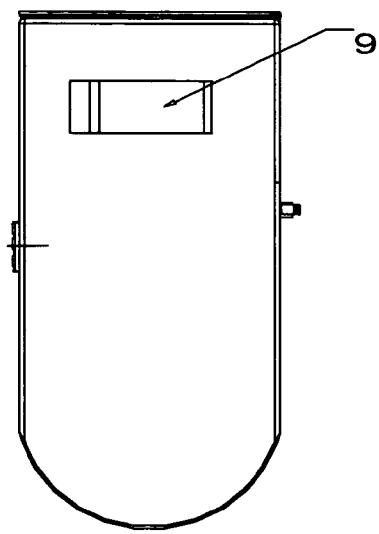
Figure 2A:
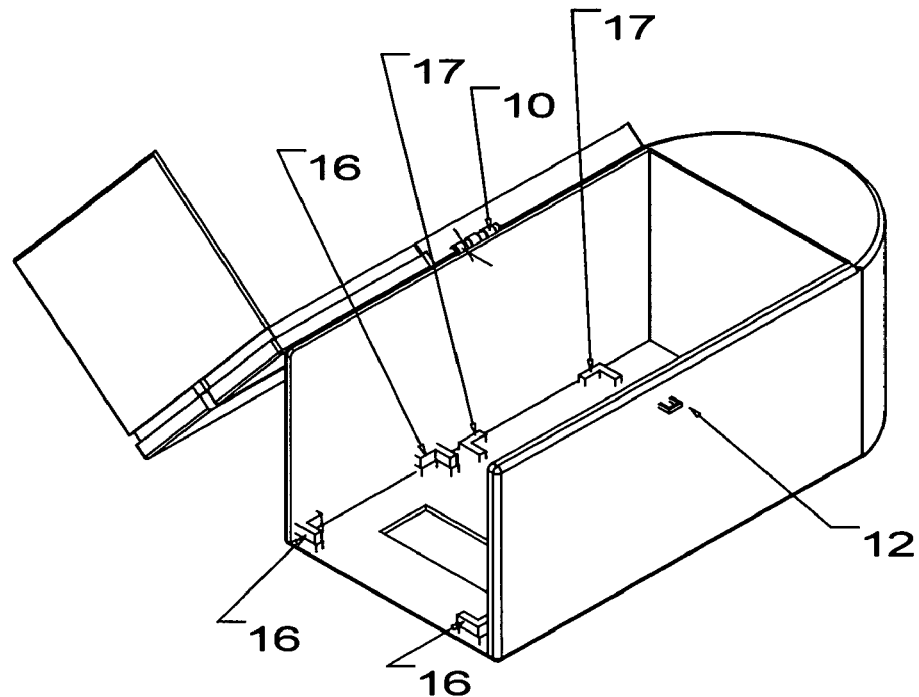
FIGS. 2A and 2B show the mouse converter unit with the top cover open.
Figure 2B:
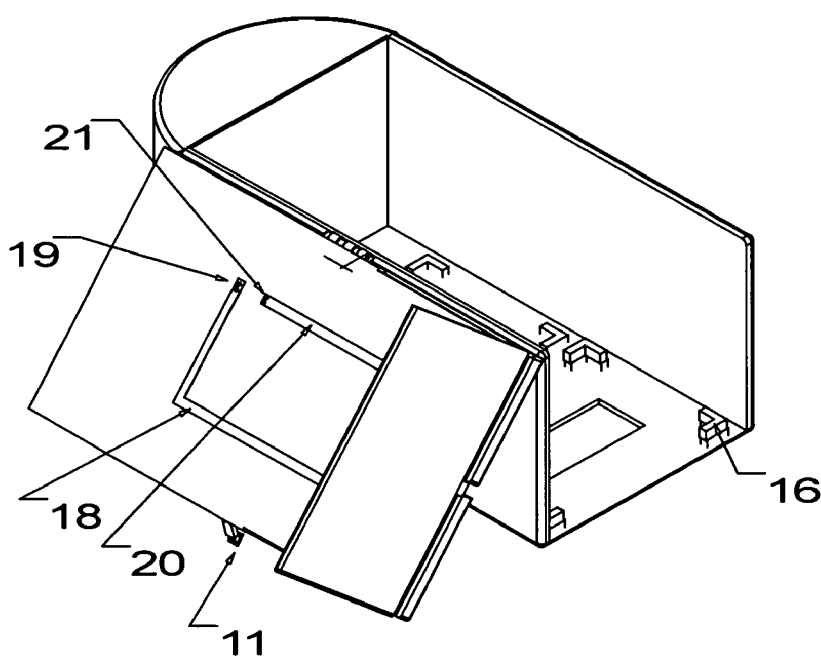

Mouse converter unit (FIGS. 1-2)

The mouse converter unit is divided into two portions: a base component 4 and a top cover 2. The top cover is attached to the base component by a hinge 10 on the right side. When the top cover is closed, it is attached to the base component by a snap-on clip 11 and a restrainer 12 combination. There are two buttons 6, 8 on the top surface, near the front. The buttons are configured as in a conventional mouse, whereby depressing a moveable plate operates a push-type switch located beneath the plate.

There is one push-type switch underneath each button. Each of the two push-type switches is placed in the path of an electrical connection 18, 20, towards the rear portion 14 of the inside of the top cover of this unit. The electrical path 18 ends in a pair of contacts 19. Similarly, the electrical path 20 ends in a pair of contacts 21.

There are two sets of corner supports 16, 17 inside the base component of the mouse converter unit so as to hold rectangular solid housings. Each set has four supports placed to define the corners of a rectangular shape. The bottom surface of the mouse converter unit has a hole 11, near the front of the unit.

Figure 3A:
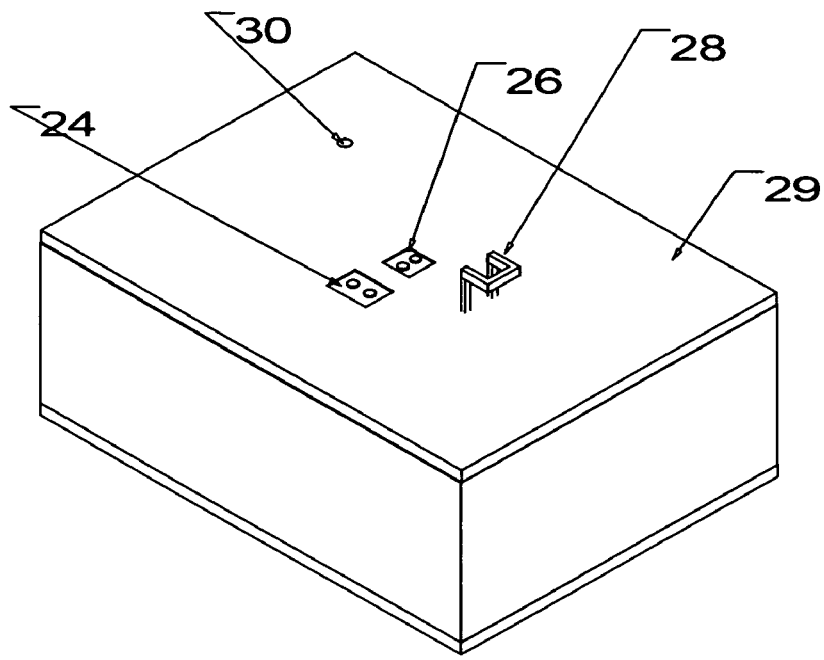
FIGS. 3A and 3B show different aspects of the sensor unit.
Figure 3B:
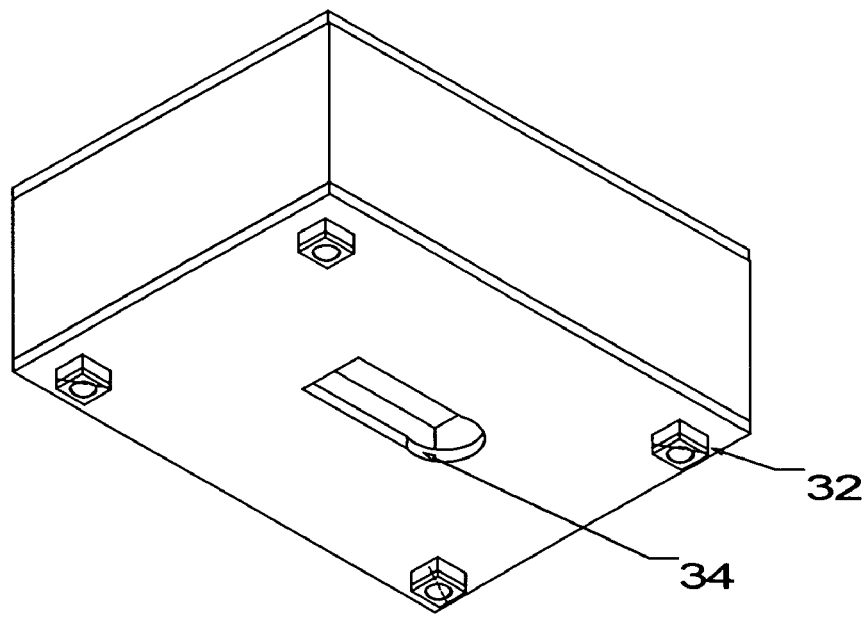
Figure 4:
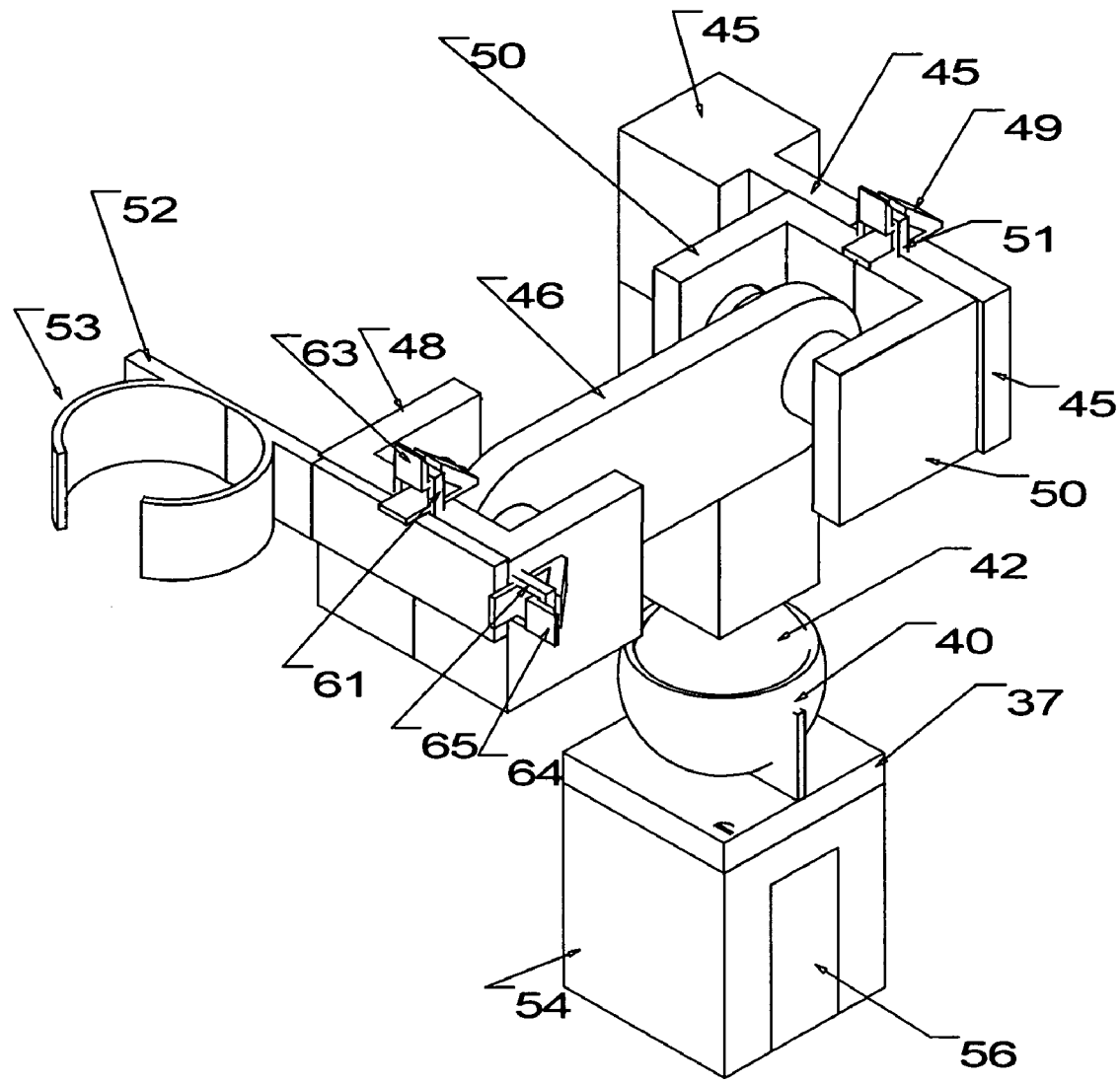
FIG. 4 illustrates one aspect of the pen attachment unit.
Figure 5:
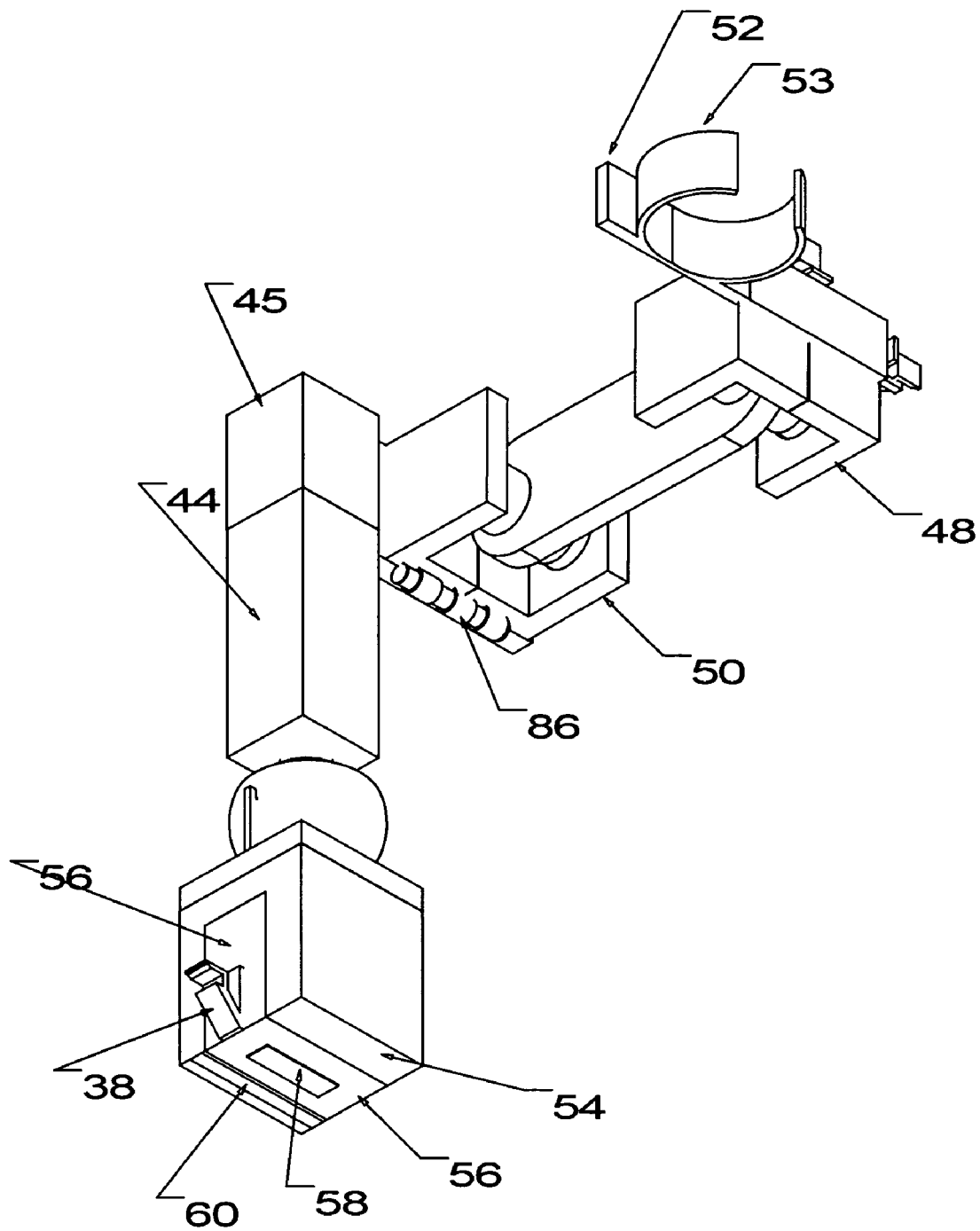
FIG. 5 shows another aspect of the pen attachment unit.
Figure 6A:
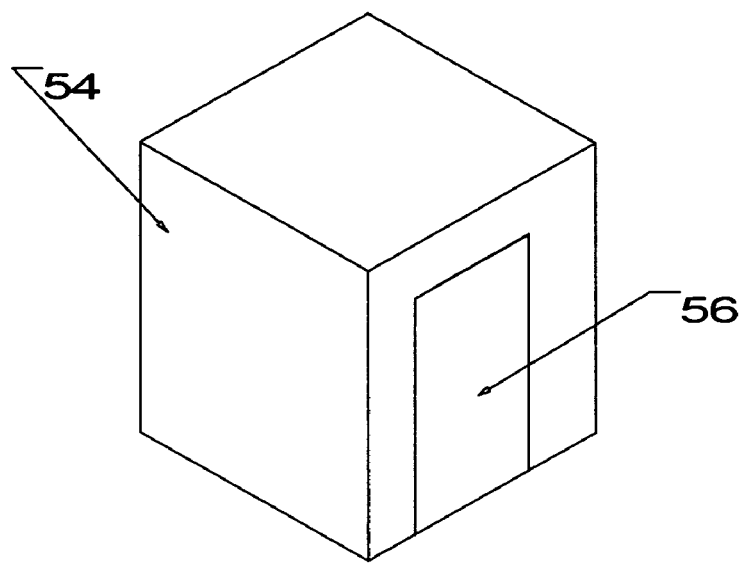
FIGS. 6A and 6B show different aspects of the slider unit of the pen attachment unit.
Figure 6B:
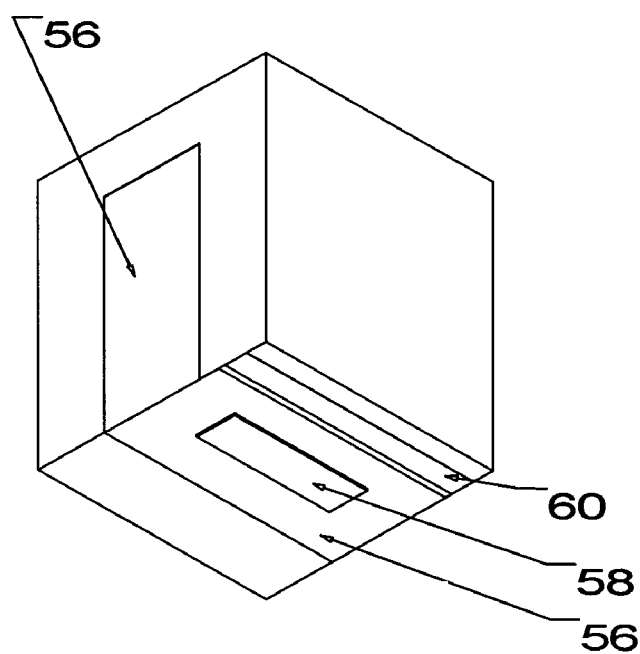
Figure 7:
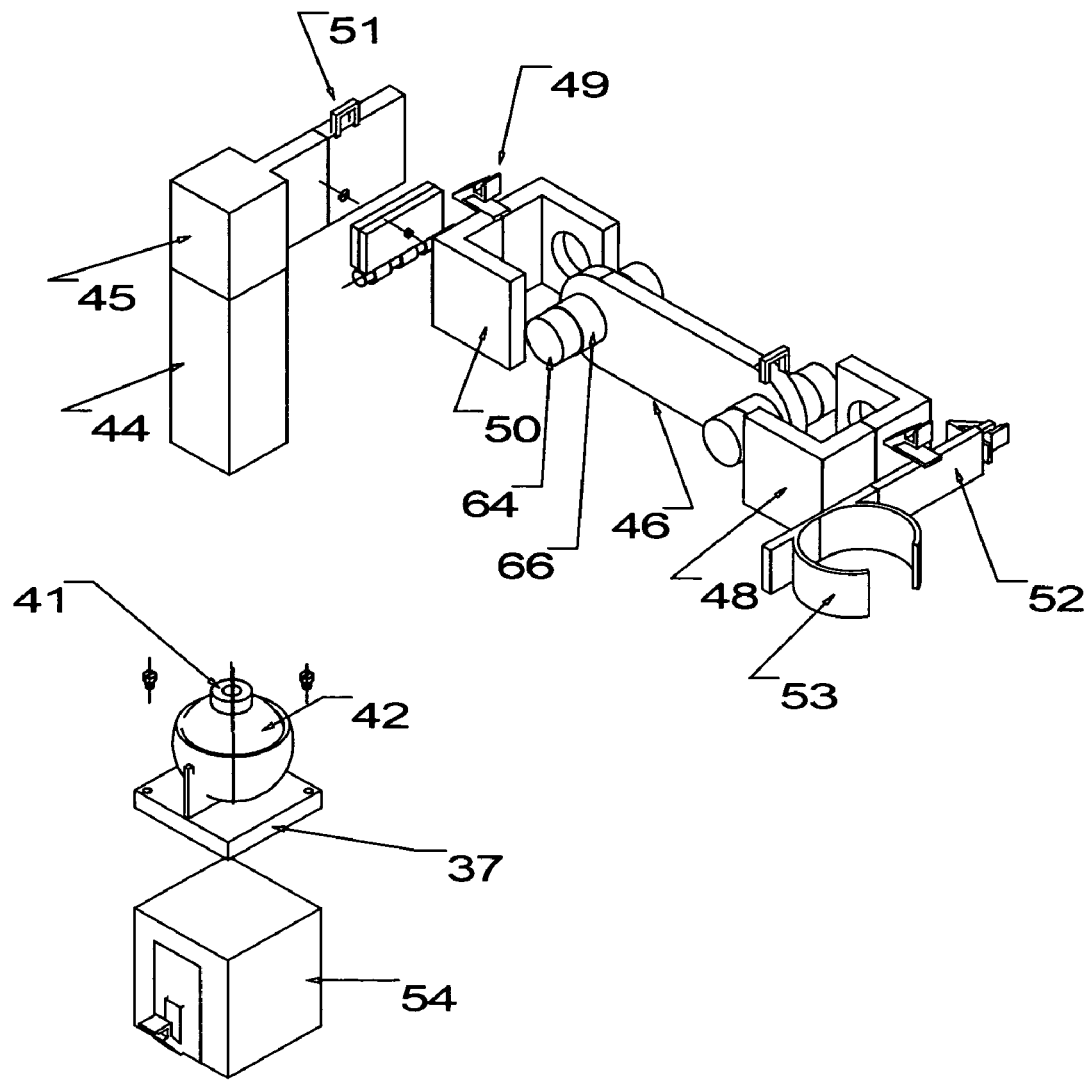
FIG. 7 shows the pen attachment unit in an exploded view.

Sensor Unit (FIG. 3)

The sensor unit is a rectangular housing containing motion sensor arrangement. The top surface has electrical contacts 24, 26 and a hole 30 to pass through electrical wire connection from another unit. The bottom surface of the sensor unit has four roller ball wheels 32, each fit in a socket. A hole 34 in the bottom surface is configured such the surface below is visible from inside the sensor unit. A restrainer 28 for a snap-on clip is affixed to the top surface.

Inside the sensor unit is fitted a commercially available optical sensor unit. An optical sensor unit kit such as ADNS-2620 by Agilent Technologies of Palo Alto, Calif. is suitable for fitting into the sensor unit housing. The sensor unit is configured such that the camera lens has a view of the surface in focus, through the holes in the bottom surface 34 and the bottom cover 11 of the mouse converter unit.

Pen Attachment Unit (FIGS. 4-7)

The pen attachment unit consists of a vertical element and a horizontal element. The vertical element of the pen-attachment unit consists of (i) a slider unit 54, 56, (ii) a spherical joint 37, 40, 42 and (iii) an arm 44 that attaches to the spherical joint and extends away from it. The bottom portion of the stationary part 56 of the slider unit forms the base of the pen attachment unit. The base portion is referred as the second attachable end of the pen attachment unit. The slider unit is configured such that the sliding member 54 of the slider unit can be extended away from the base of the pen attachment unit.

There is a first strip of electricity conducting element or contact element 58 placed on this bottom surface, part of a first contact switch. A first snap-on clip 38 is fastened to a side surface of the stationary part of the slider unit. There is a second strip of electricity conducting element or contact element 60 placed on the moveable portion of slider unit. This element is part of a second contact switch.

On top of the sliding member is attached a spherical joint. The spherical joint has a base 37 to which is attached a spherical shell 40 containing a ball 42 with a protrusion 41. An arm 44 extends from the spherical joint. The arm has a hole to receive the protrusion of the ball 42 of the spherical joint. The top end of the arm has an L-shape piece 45 and the end of the L-shaped piece is attached a first U-shaped connector 50 by a hinge 86 and by a snap-on clip 49 and receptacle 51 arrangement. Each of the two limbs of the first U-shaped connector 50 has a hole, aligned with each other. The first U-shaped connector 50 is attached to one end of a link 46, part of a horizontal element.

The horizontal element consists of (i) the link 46, (ii) a second U-shaped connector 48 and (ii) a pen-clip 52. The link is a flat rectangular part linking the arm of the vertical element at one end and the clip on the other end, along its longer dimension. There are four end protrusions on the link, two on each face of the link. Each protrusion is made of two concentric cylindrical portions 64, 66 with a spring inside the larger cylindrical portion extending until the back face of the smaller cylinder.

Using the two protrusions on one end of the link, the horizontal element is attached to the vertical element by fitting in the two holes of the U-shaped connector in the arm. The diameter of the protrusion is relatively smaller than the diameter of the corresponding holes in the limbs.

The protrusions at the other end of the link are fitted in the corresponding holes on a second U-shape connector 48. The second U-shaped connector is configured similar to the first U-shaped connector, except that the limbs of the two U-shaped connectors face each other. The diameter of the protrusion is relatively smaller than the diameter of the corresponding holes in the clip.

A third 61 and fourth 65 snap-on restrainers are attached to this second U-shaped connector. Corresponding to the snap receptacles 61 and 65, a third 63 and fourth 64 snap-on clip is attached to a pen-clip 52. The pen-clip 52 has an arc shaped element 53 used to attach the device to the pen-shaped object. It is affixed to the back surface of the U-shaped connector piece by the third 61, 63 and fourth 64, 65 snap-on clip arrangements. The clip forms the first attachable end of the pen attachment unit.

Figure 8A:
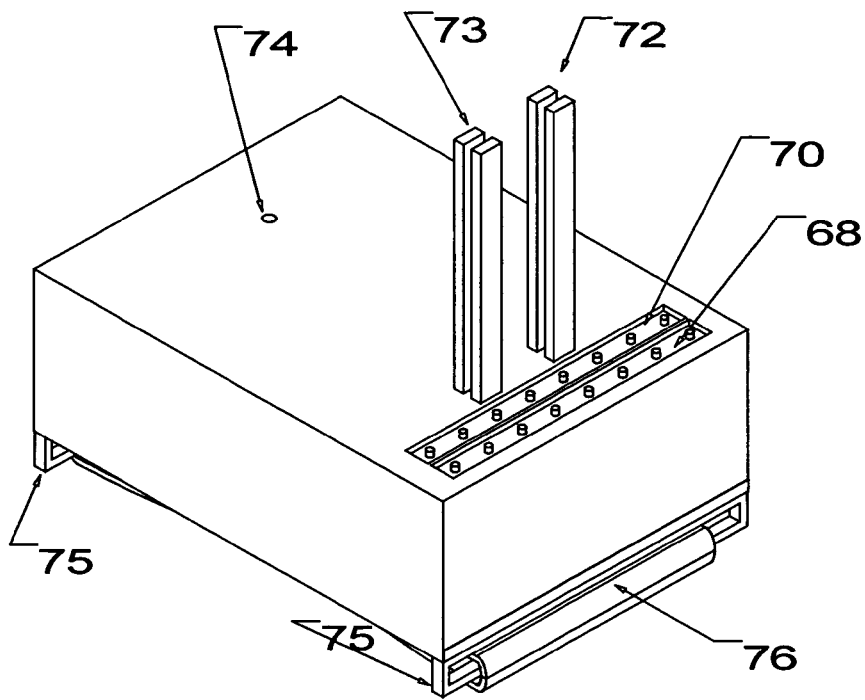
FIGS. 8A and 8B shows different views of the processor unit
Figure 8B:
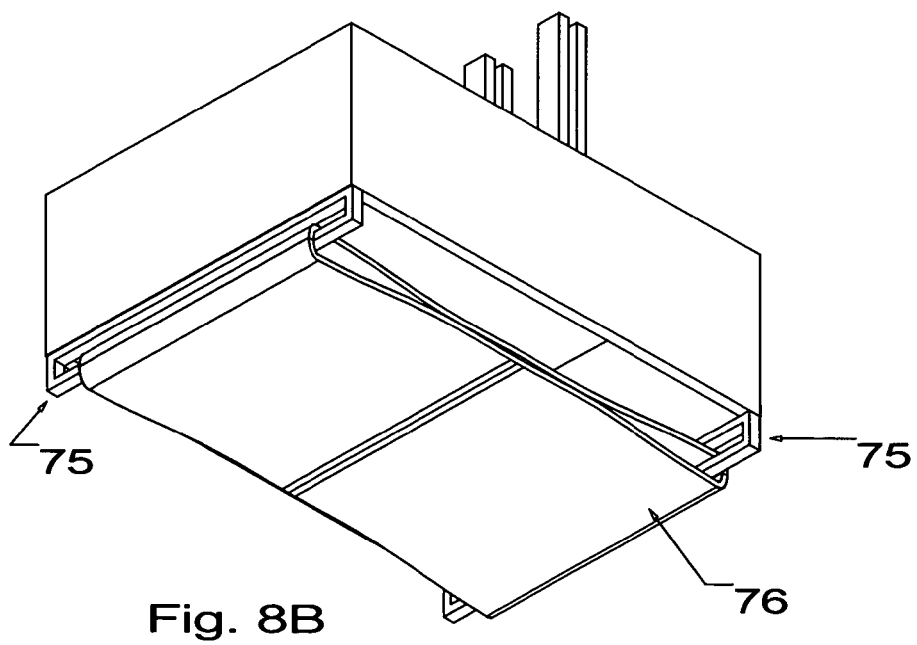
Figure 9A:
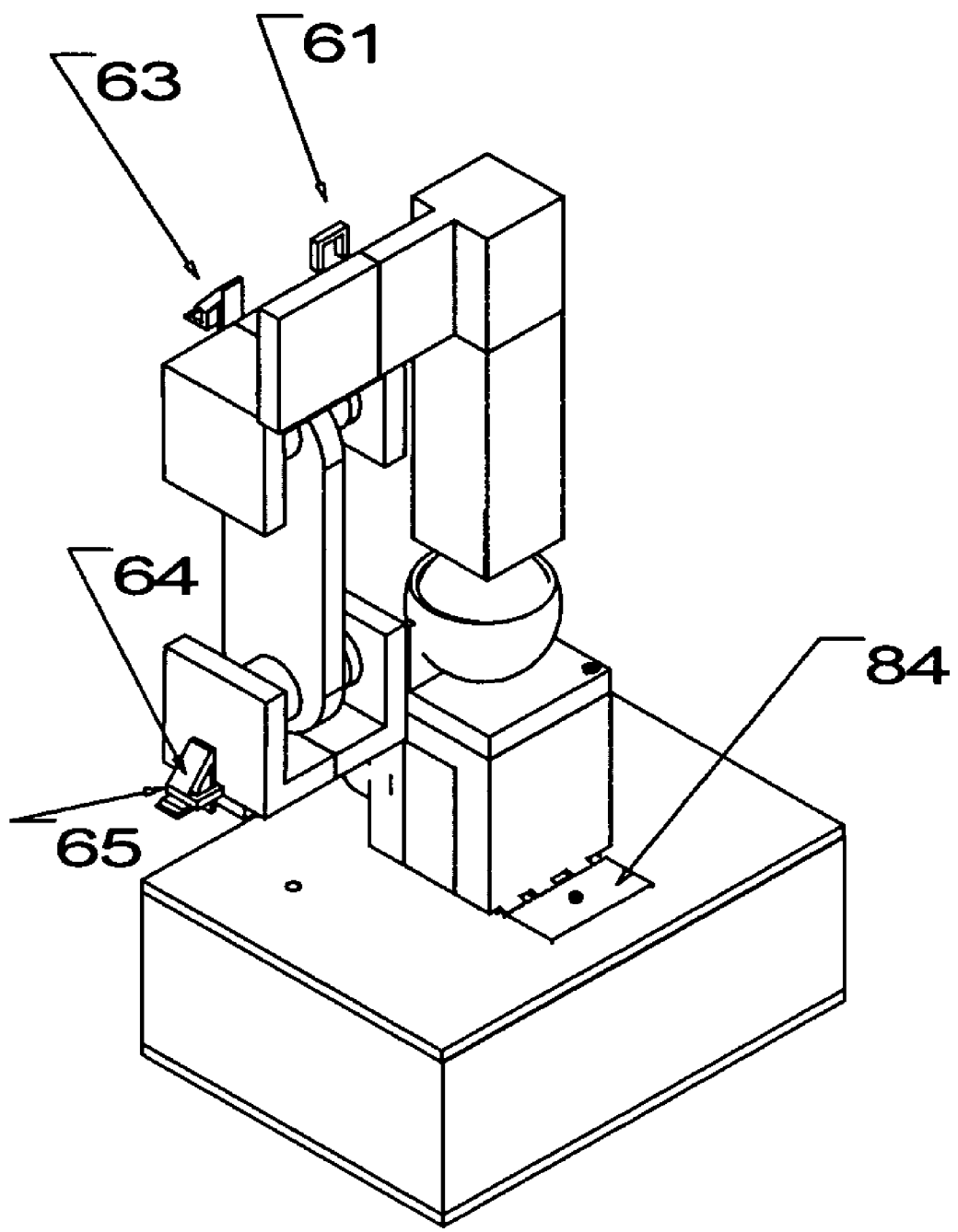
FIGS. 9A and 9B show different aspects of the attachment of the sensor unit and the pen attachment unit, with the horizontal arm is in folded position.
Figure 9B:
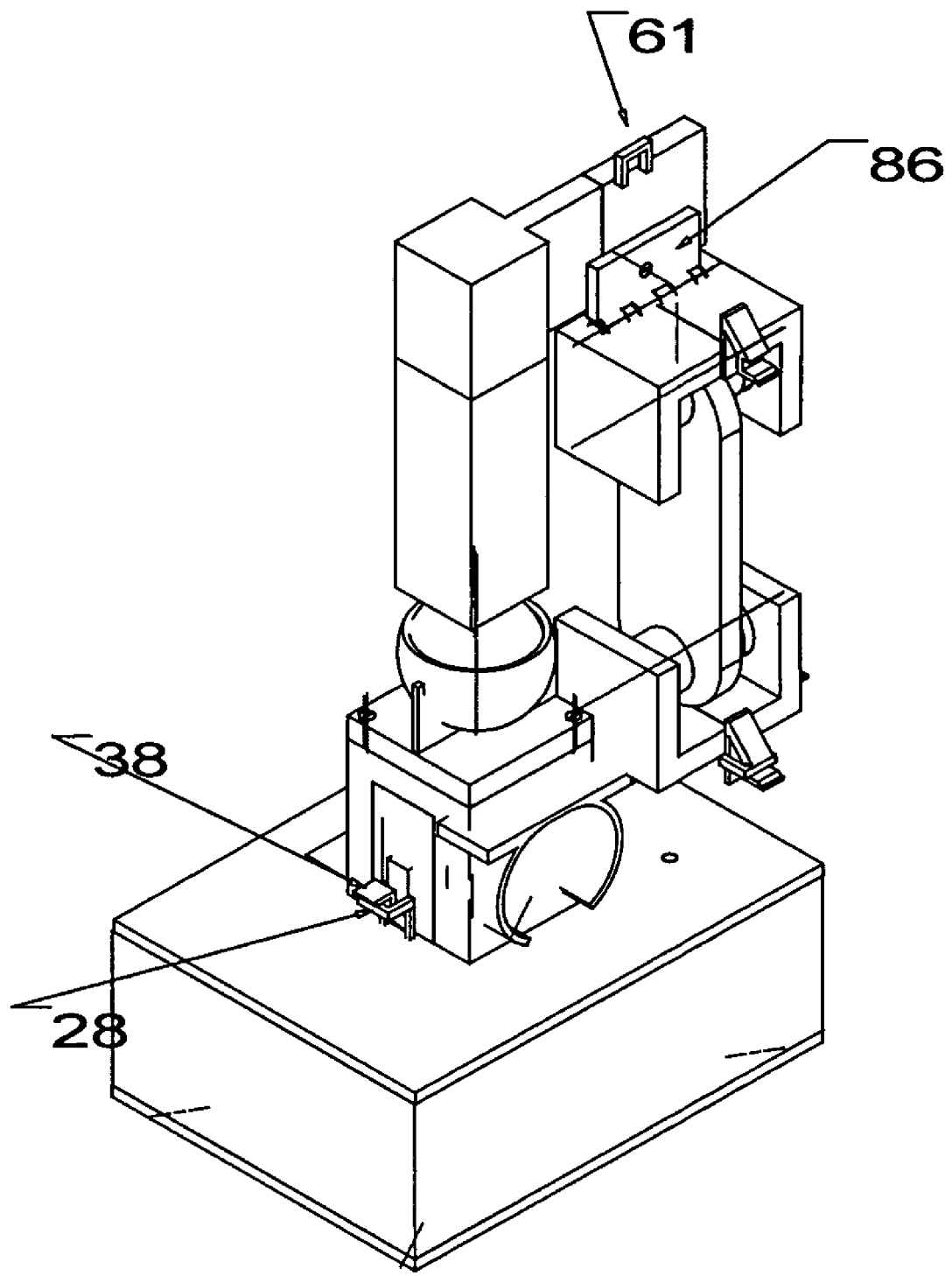
Figure 10:
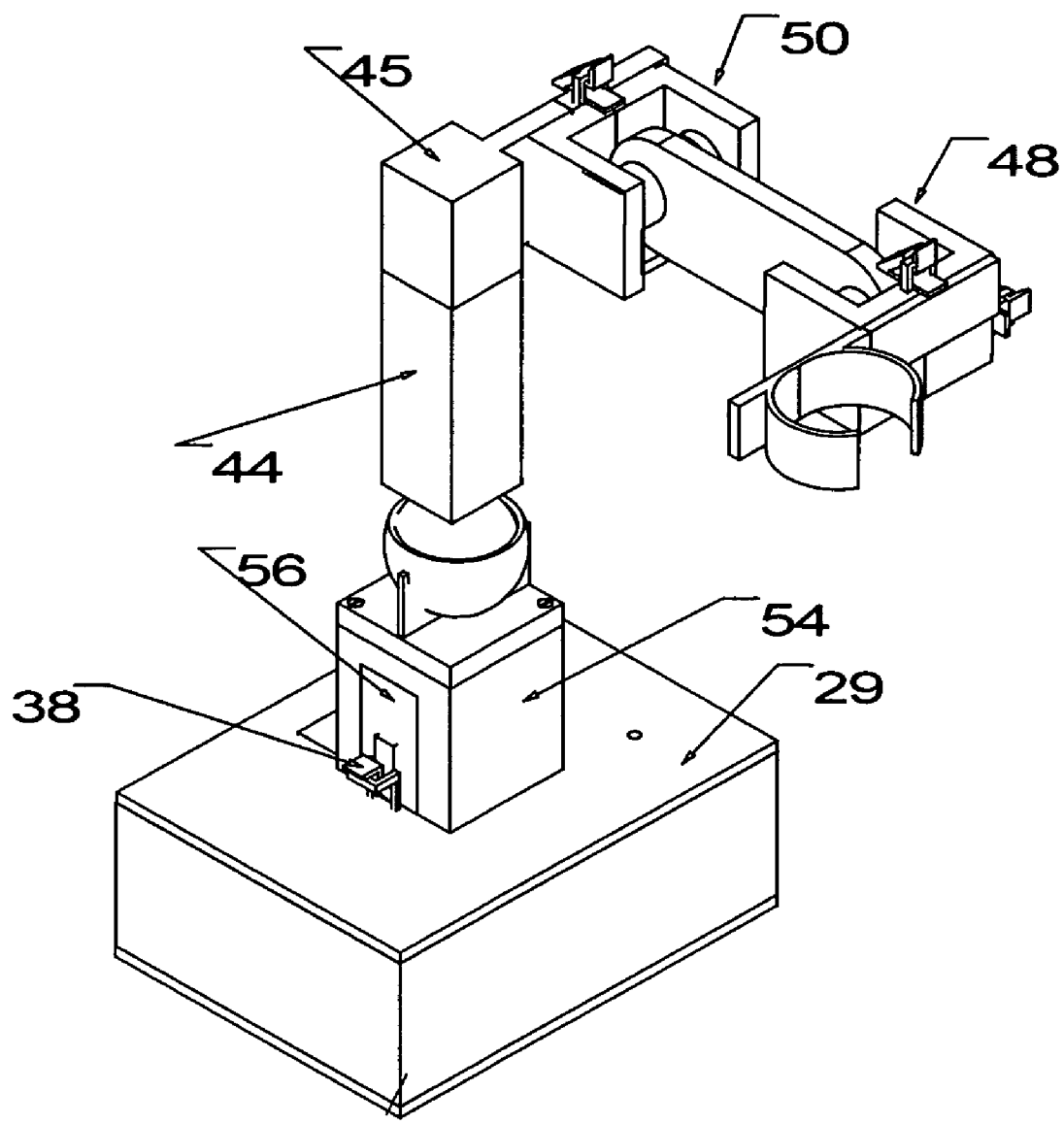
FIG. 10 shows the attachment of the sensor unit and the pen attachment unit with the horizontal arm in normal position.
Figure 11A:
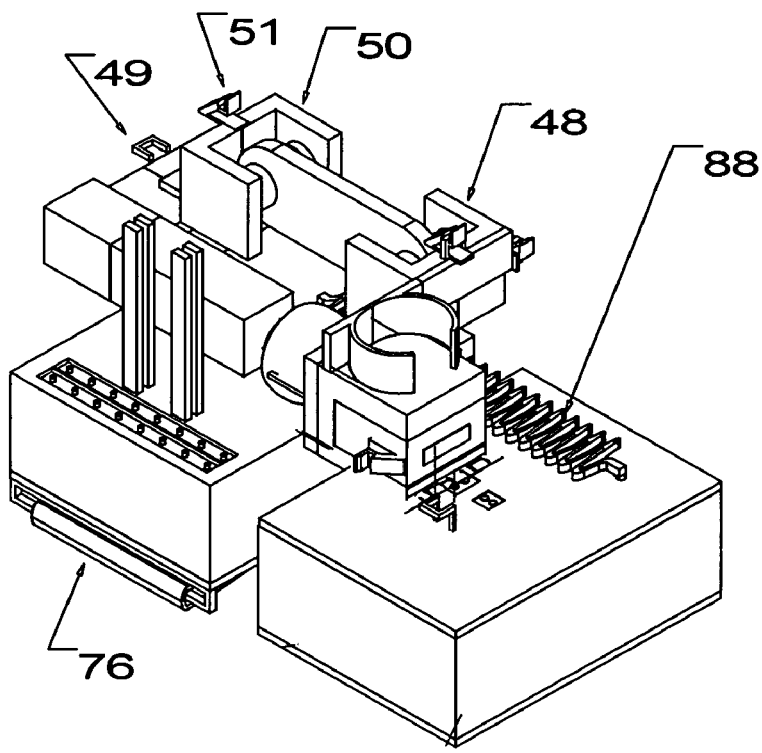
FIGS. 11A and 11B show the processor unit placed proximal to the combination of sensor unit and the pen attachment unit, with both the horizontal arm and the vertical arm folded down.
Figure 11B:
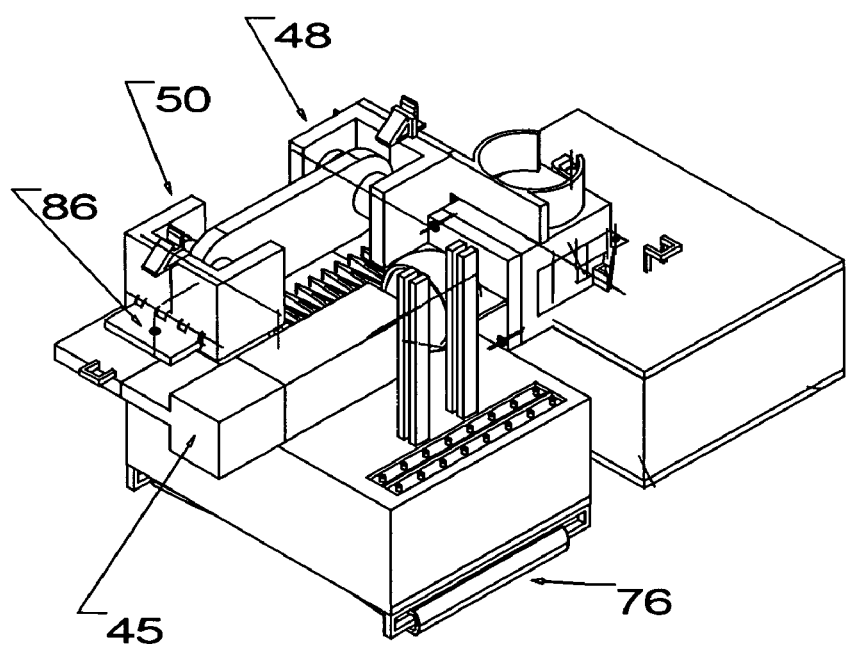
Figure 12A:
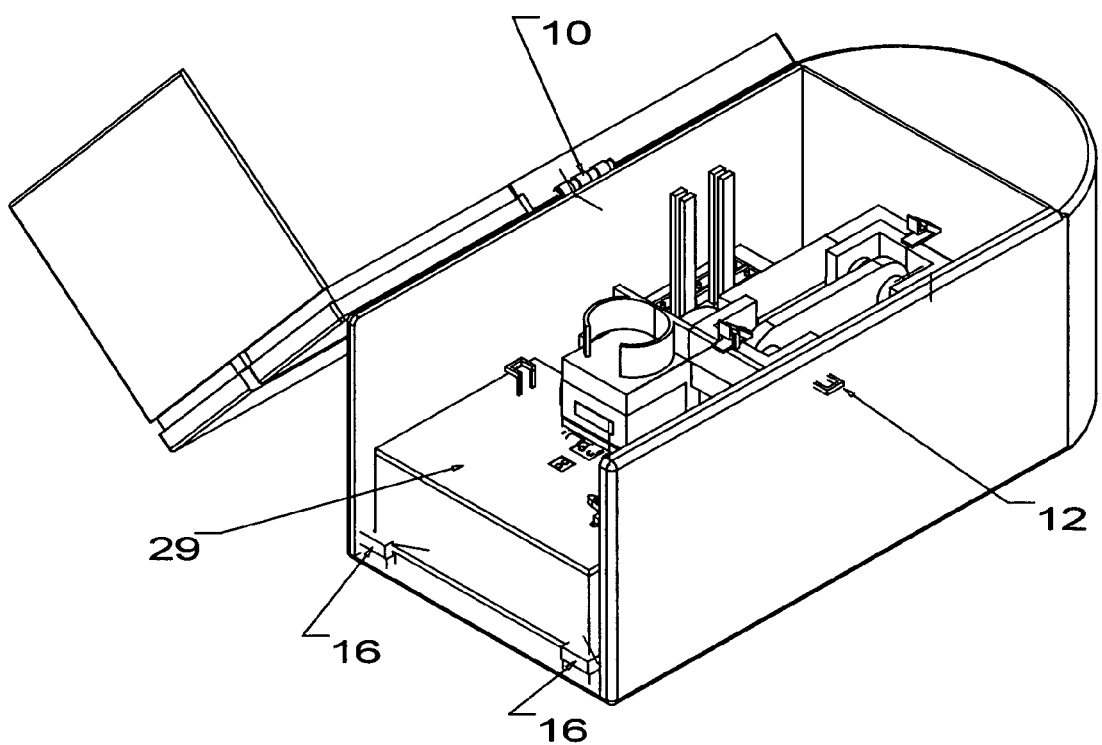
FIGS. 12A and 12B show different aspects of a configuration of the sensor unit, the processor unit and the pen attachment unit placed inside the base component of the mouse converter unit.
Figure 12B:
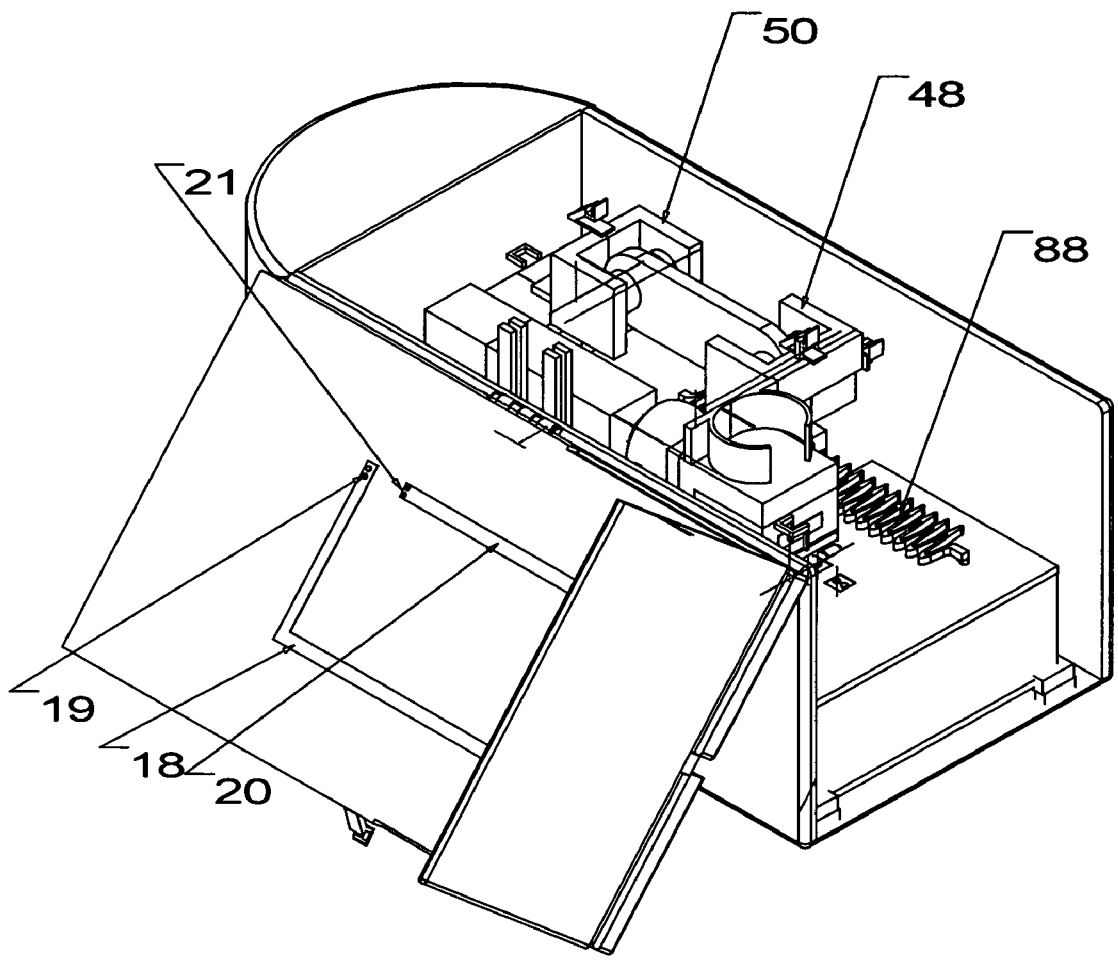
Figure 13:
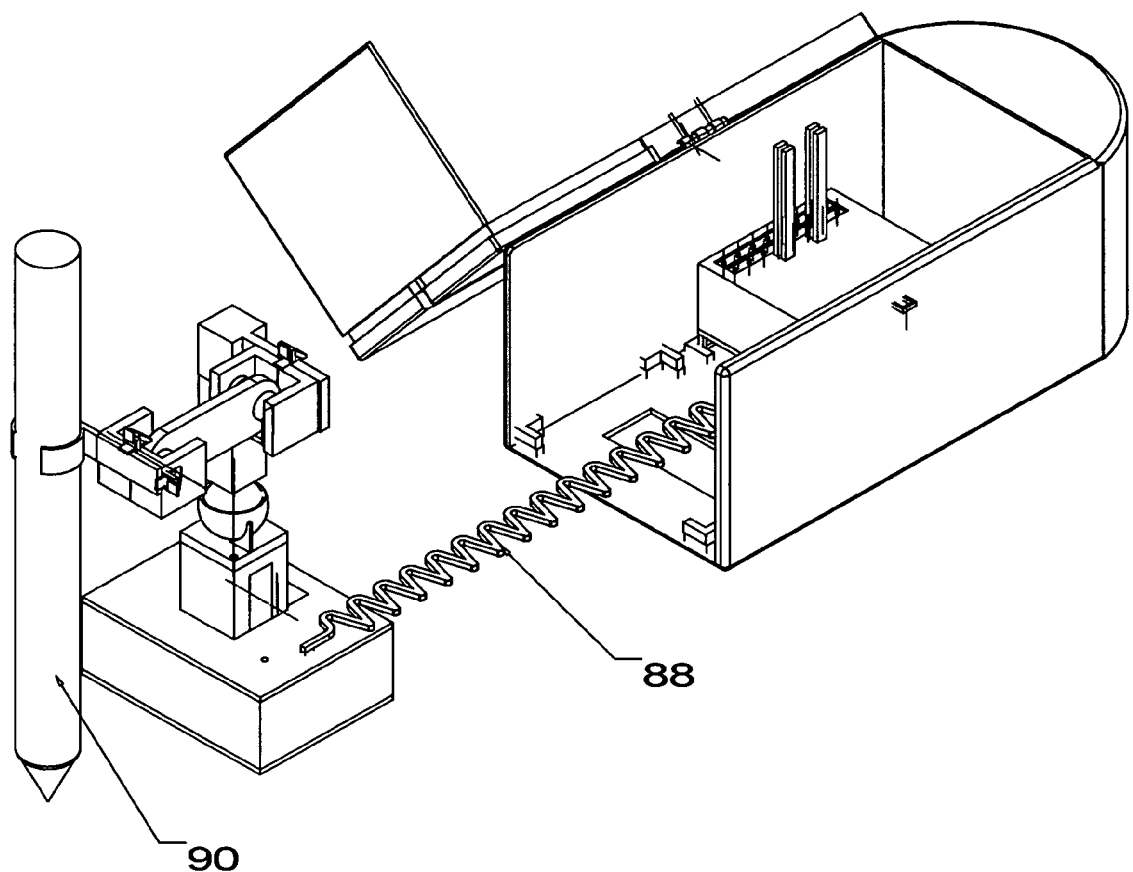
FIG. 13 shows the apparatus attached to a pen-object for operation in the pen-input mode.

Processor Unit (FIG. 8)

The processor unit consists of a rectangular housing. The housing for the processor unit contains of microcontroller, memory or storage elements and wireless communications components. The base of the processor unit has two U-shaped stands 75 that have openings, opposite to each other. The opening is large enough to insert an elastic strap 76 so that the strap runs parallel to the bottom surface and through both the openings.

The processor unit has a hole 74 for electrically connecting to the sensor unit by a flexible coiled wire. There are two pairs of electrical contacts 72, 73 on the top surface of the processor unit housing, aligned with the two sets of contacts 18, 20 on the inside portion of the top cover of the mouse converter unit.

There is an array of task buttons 68 and an array of indicator lights 70 placed on the front surface of the processor unit.

Interaction of the Units (FIGS. 3, 7, 9-11)

A pen attachment unit is fixed to the top surface of the sensor unit through a hinge joint 84 so that it can rotate 90 degrees. The unit can remain either parallel or perpendicular to the sensor unit surface, depending on the mode of operation.

The pen attachment unit is further attached to the top surface of the motion sensor unit by means a snap-on clip arrangement. The restrainer 28 for the snap-on clip 38 is affixed to the sensor unit and the snap-on clip 38 is affixed to a side surface of the stationary part 56 of the slider unit.

The attachment of the sensor unit and the pen attachment unit using hinge 84 and snap clip arrangement 28, 38 constitute the first mounting means.

The sensor unit is connected to the processor unit electrically by a wire for power, contact switch signals and motion signals. The two units can be placed near each other or spaced apart. When spaced apart, the electrical wire 88 stretches, accommodating the change in separation between the two units.

The pen clip 52 with a provision 53 for mounting a suitable object is referred as the second mounting means.

Configuration of the Preferred Embodiment

In the preferred embodiment, the device can be operated in the three stated modes. The configuration of each of the modes of the preferred embodiment is described below.

Configuration of the Mouse mode (FIGS. 1-2, 9-12)

To configure the device for mouse mode of operation, the processor unit is placed on the inside of the bottom portion of the mouse converter unit. They are placed such that the four corners at the bottom of the sensor unit are held in place by the second set 17 of four corner supports, towards the back of the mouse converter unit.

The pen attachment unit is not used in this mode of operation and hence it is folded at the two hinge joints. The vertical link of the pen attachment unit is folded by unlatching the second snap-on clip 63 and by rotating it to be parallel to the slider unit. Next, the first snap-on clip 38 is unlatched and the pen attachment unit is rotated to lie parallel to top surface of the sensor unit housing. This compacting means allows the pen attachment unit to be placed within the mouse converter unit.

The combination of sensor unit and the pen attachment unit is placed on the inside of the bottom portion of the mouse converter unit. They are placed such that the four corners at the bottom of the sensor unit are held in place by the first set 16 of four corner supports, at the front of the mouse converter unit.

The top cover of the mouse converter unit is closed and latched using the snap-on clip 12. The two pairs of contact elements 19, 21 on the top cover of the mouse converter unit are aligned to be in contact with the two pairs of contact elements 72, 73 on top surface of the processor unit.

When the top cover of the mouse converter unit is closed, the device resembles a conventional mouse.

Configuration of the Pen-input mode (FIGS. 3-5, 10, 13)

To configure the device for pen-input mode of operation, the sensor unit and the pen attachment unit are moved from inside the mouse converter unit and placed on the surface. The pen attachment unit is unfolded to latch the snap-on clips 38, 63 in place. As a result, the vertical element of the pen attachment unit is orthogonal to the surface. A pen 90 is attached to the semi-circular portion 53 of pen clip 52 such that the horizontal element is parallel to the surface, when the pen is orthogonal to the surface.

When in vertical position, the contact elements 58, 60 in the bottom surface are aligned with the two contact elements 26, 24 on the sensor unit. The first contact switch is formed by the elements 26 and 58. The second switch is formed by the elements 24 and 60.

The processor unit is not required to be left inside the mouse converter unit during operation in pen-input mode, but as a convenience measure it is left inside the mouse converter unit.

Figure 14:
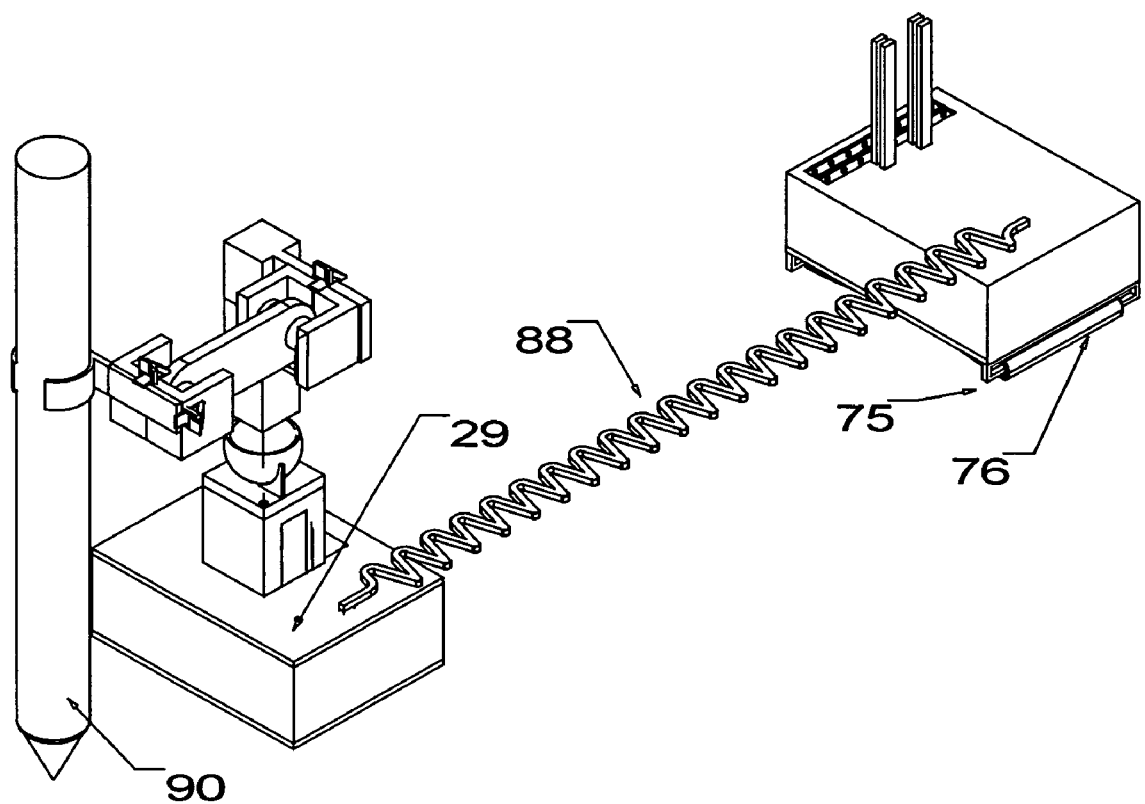
FIG. 14 shows the configuration of a pen object, the sensor unit, the pen attachment unit and the processor unit for operation in pen-computer mode.
Figure 15:
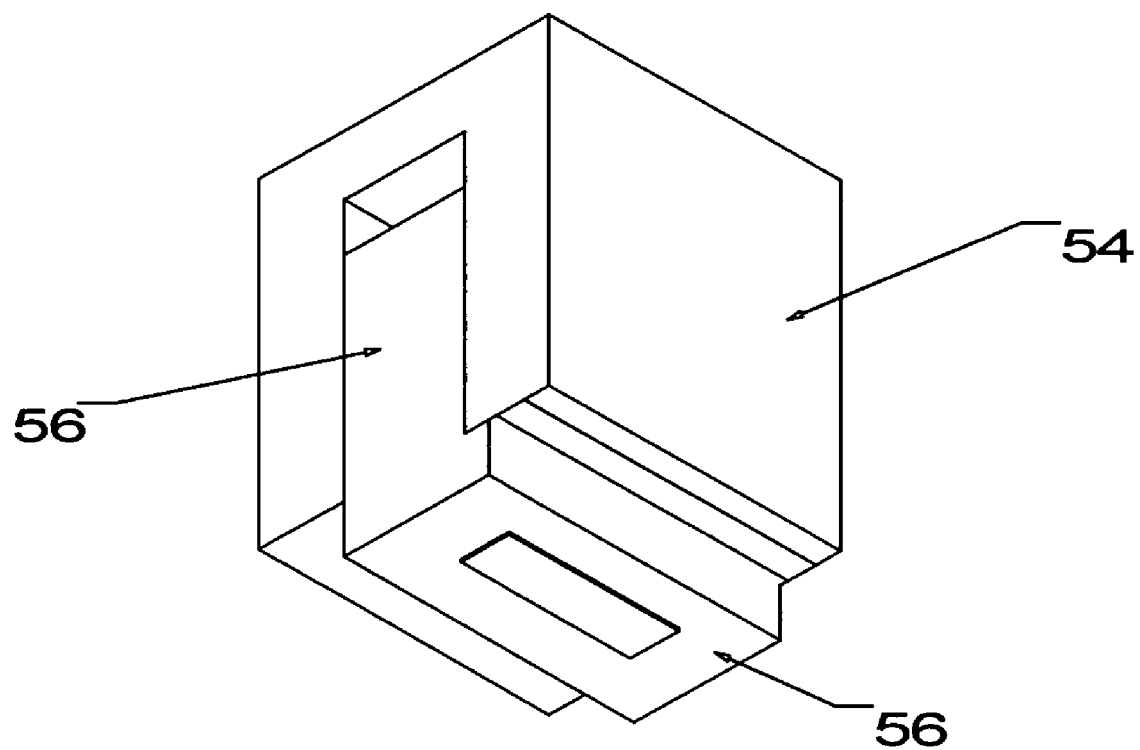
FIG. 15 shows the slider unit when the sliding member moves relative to the stationary member.
Figure 16A:
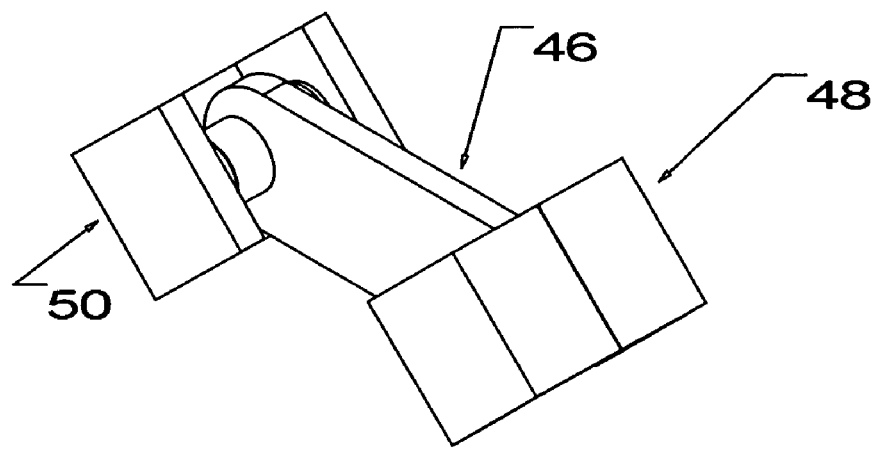
FIGS. 16A and 16B show the link mechanism allowing the two U-shaped connectors to rotate independently.
Figure 16B:
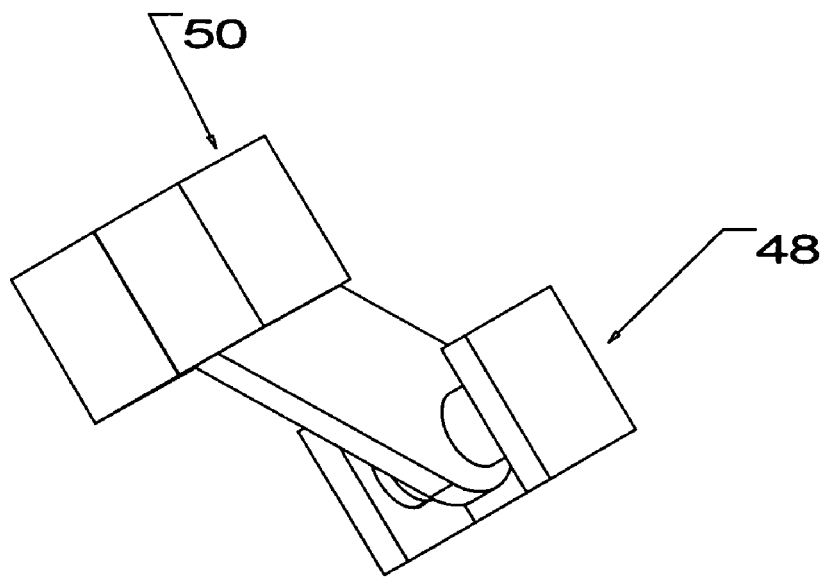

Configuration of the Pen-computer mode (FIGS. 8, 14)

The configuration of the device for pen-computer mode is similar to that for pen-input mode, except for the differences noted here. The processor unit is removed from the mouse converter unit and either placed on a nearby surface or conveniently strapped on to the back of the palm of the hand holding the pen. The palm of the hand can be inserted into the elastic strap 76 so that the processor unit is positioned at the back of the hand. The convenience of the wearable option makes it extremely portable.

Operation

Operationally, the sensor unit and processor unit are required in each of the three modes. The mouse converter unit is required in the mouse mode and optional in the pen-input and pen-computer modes. The pen-attachment unit is essential for the pen-input and pen-computer modes and is not used in the mouse mode.

Mouse Mode Operation

The mouse converter unit provides the look and feel of a conventional mouse. In the mouse mode, the device operates similar to that of a conventional mouse.

Relative movement of the mouse over a surface is tracked by the sensor unit. The processor unit tracks the cumulative movement and periodically communicates the motion to a host device via wireless connection.

The following describes the mouse-mode operation of the mouse converter unit, the motion sensor unit and the processor unit in more detail.

Mouse Converter Unit

The two buttons 6, 8 on the top front portion of the device serve the functions of the buttons found in a conventional mouse device. In normal position of the left button, the electrical circuit 18 is open. When the left mouse button is pressed, the switch is activated and the electrical circuit is closed. This change of state helps distinguish the two distinct positions of a button. The operation of the right mouse button is similar except it uses the electrical circuit 20.

Motion Sensor Unit

The sensor unit employs optical motion sensing technology to detect the motion experienced by the device. The motion sensing unit consists of housing for sensors, placed proximal to the surface. In fact, the operation of the sensor unit is common to all the three modes of operation of the device.

The thickness of the bottom cover of the mouse converter unit is such that the optical arrangement is focused on an area underneath the surface.

The sensor unit is configured to detect linear motion. The optical arrangement of the kit ADNK-2620, manufactured by Agilent Technologies of Palo Alto, Calif., consists of a light source projected onto the surface through a lens. The light is projected through one part of the hole. The optical mechanism is configured such that the (magnified) reflection of the light from the surface is aligned to travel to an imaging camera. The imaging camera is mounted to face the surface through another portion of the hole. The kit consists of an image processor integrated along with the imaging camera. The detected motion is output for each of the two orthogonal axes. The direction of the two axes is arbitrary, in general, but contained in a plane parallel to the surface. The optical sensor is fit into the housing such that the Y axis is aligned along the direction of the length of the mouse. The X axis is aligned perpendicular to the Y axis in a plane parallel to the surface.

The image processor in the optical sensor kit takes a snapshot of the surface underneath the sensor and compares successive images over a short interval to detect linear motion.

Processor Unit

The processor unit in the preferred embodiment consists of microcontroller, memory, power unit and communications unit. The top surface of the processor unit has contacts for the left and right mouse buttons. The processor unit is electrically connected to the sensor unit by a flexible wire 88.

The electrical connections are for (i) power supply, (ii) X and Y motion output, (iii) first and second contact switches. The processor unit is connected to a host device by means of wireless communications.

The processor unit identifies mouse-input mode operation when the first contact switch, underneath the pen attachment unit, is in OFF position (i.e. when the contact elements 58, 26 of the switch do not touch each other). In the mouse mode, lifting the mouse converter unit turns off motion detection, since the optical sensor no longer tracks motion. When the device is moved on the surface the motion is tracked and relayed to the host device. Additionally, when the left 6 or right 8 button's state toggles, that change in state is relayed along with the detected motion.

Pen-Input Mode Operation

In the pen-input mode, the apparatus is attached to an ordinary pen and the operator input is relayed to a host machine. The following describes the operation of each of the units of the device, in this mode of operation.

Mouse Converter Unit

As stated earlier, the mouse converter unit is not required for exclusive operation in the pen-input mode. However, since the apparatus can be used in situations where frequent switching between mouse and pen-input modes is needed, it is advantageous to leave the processor unit inside the mouse converter unit. The motion sensor and pen attachment units are moved outside the mouse converter unit to enable attaching a pen to the device in this mode.

Motion Sensor Unit

The motion sensor unit operates the same way as in the mouse mode. When the motion sensor unit is moved outside the mouse converter unit and placed on the surface, the wheels underneath the sensor unit are in contact with the surface directly. The wheels allow the sensor unit to be moved on the surface easily.

Pen Attachment Unit (FIGS. 3-5, 10, 15, 16)

The pen attachment unit is positioned for operation in the pen-input mode, as stated earlier. A ball-point pen 90 is shown for the purposes of explanation, although the pen-clip can be attached to any pen with a suitable cross section.

The attachment of the pen to the device is such that the movement of the pen-tip on a plane parallel to the surface is tracked by the sensor unit. The navigation motion of the pen is de-coupled from the sensor unit by the slider unit (made of 54 and 56). When switching from motion on surface to navigation motion, the moveable part 54 of the slider unit moves away from the surface. Consequently the second contact switch (made of elements 60 and 24) breaks contact indicative of the breaking of contact between the tip of pen and the surface.

The pen attachment unit is used in both the pen-input and pen-computer modes. The unit is suitable for operation when the vertical and horizontal elements of the pen-attachment unit are unfolded and into their respective positions. When in vertical position, the contact switch (made of elements 58, 26) at the base of the slider unit is turned on and this signals the processor unit to interpret the mode of operation as the pen-input mode.

The pen attachment unit serves the vital function of attaching the apparatus to an ordinary pen. As stated earlier, the pen-attachment unit ensures that the pen can be attached at a convenient orientation with respect to the surface. The attachment can be made at a convenient inclination with respect to the surface.

Navigation De-Couple

In the preferred embodiment, the sensor unit is designed to stay proximal to the surface even during the navigational motion of the object. Navigation motion above the surface involves a component of motion of the object tip in a direction normal or perpendicular to the surface. Depending on the user's style of moving the pen, the amount of motion above surface, during navigation, can vary. Typically, the optical motion detection arrangement will not detect linear motion on a plane parallel to the surface, when the sensor unit is lifted off the surface by more than a predetermined distance. This limitation serves well for cursor control in mouse mode, but is not appropriate for tracking writing motion in pen-input or pen-computer modes.

In the preferred embodiment, the sensor is designed to stay proximal to the surface, and remain at the same distance from the surface, even when the object tip is lifted off the surface. This is achieved by the configuration of a slider unit. Any navigational motion is de-coupled from the sensor unit by a sliding member 54 of the slider unit that moves in tandem with the component of motion of the object perpendicular to the surface, while leaving the sensor unit unaffected.

Contact Detection

The slider function in the pen attachment unit is used to detect the state of contact between the pen-tip and the surface. This is accomplished by the second contact switch. The second contact switch is formed by two contact elements 24, 60 that can be moved relative to each other. The upper contact element is a strip attached to the lower surface of the sliding member of the slider unit. The lower contact element is a pair of contact points placed on the top surface of the sensor unit housing, aligned to be in contact with the upper contact element when the sliding unit is at rest.

During navigational motion, the sliding member 54 of the slider unit moves away from the top surface of the sensor unit thereby breaking changing the state of the contact switch formed by the upper contact strip and the lower pair of contact points.

Attachment of the Pen

The pen can be attached at different inclinations with respect to the surface. Since the pen and the pen attachment unit have different pivot points for rotation, a mechanism is needed to accommodate any change to the inclination of the pen, besides vertical position. The spherical joint and the link mechanism allow this to happen. The link mechanism allows the two U-connectors to rotate independently. When the pen is tilted towards the surface, the first U-shaped connector 48 turns away from surface, whereas the second U-shaped connector turns towards the surface. The spherical joint allows the vertical arm to be positioned at any inclination.

Processor Unit

The processor unit is left in the mouse converter unit, although it can be placed outside when operating the device in pen-input mode. The first contact switch in the pen attachment unit is in ON position for both pen-input and pen-computer modes.

In the pen-input and pen-computer modes, the processor unit uses the motion detected by the sensor unit in conjunction with the state of the second contact switch indicative of navigational motion.

The motion detected by sensor unit is declared as motion on the surface when the second contact switch is active or in the ON position (i.e. when the contact elements are in contact). When the contact switch is de-activated or in the OFF position, any motion detected by sensor unit is declared as navigational motion.

In other words, in the pen-input mode, the processor unit tracks the motion of the pen and classifies the motion into two types of motion: (i) one while the pen-tip is in contact with the surface and (ii) another while the pen-tip is not in contact with the surface. This classification is based on the two states of the second contact switch. Since the pen-input mode operates on the same communication channel as the mouse-input mode, the following is done to distinguish the two types of pen-tip motion. For the first type of motion, i.e. when the pen-tip is in contact with the surface, the "depressed left-mouse button" signal is relayed to the host, in addition to the tracked motion. For the second type of motion, i.e. when pen-tip is off the surface, the motion is relayed without any accompanying mouse button signal.

Pen-Computer Mode Operation

In the pen-computer mode, portion of the device is attached to an ordinary pen and the operator input is processed and stored in the device. The following describes the operation of each of the units of the device, in this mode of operation.

Mouse Converter Unit

In the third mode of operation, pen-computer, the processor unit is also slid out of the mouse-converter unit. The mouse converter unit is not explicitly used in this mode of operation.

Motion Sensor Unit

The motion sensor unit operates similarly to that in the pen-input and mouse modes.

Pen Attachment Unit

The pen attachment unit operates similarly to that in the pen-input mode.

Processor Unit

There is an array 68 of task or action buttons on the processor unit. They are for (i) choosing pen-computer mode, (ii) choosing text or graphics input, (iii) activating host synchronization step, (iv) erasing operator input recorded and (v) turning on and off the unit.

There is another array 70 of lights for indicating status. Corresponding to the five task buttons, there are five status indicators: (i) pen-computer mode operation, (ii) graphics input condition and (iii) host synchronization in progress condition, (iv) Erase contents from memory, (v) motion tracking on or off, in the pen-computer mode.

To operate the device in the pen-computer mode, a button on array of task buttons 68, on the processor unit housing, is pressed. In this mode, the processor unit is primarily configured for offline pen-input whereby the user input is processed and stored in the apparatus.

Meta information about user-input is also allowed to be provided. The user can select graphics mode or text mode before providing input, by pressing a button. In the text mode, handwriting recognition is employed to store the written characters, instead of raw input coordinates.

A mechanism for synchronization with a host device is provided. When the host synchronization button is pressed, the contents of the pen-computer are relayed to the host machine. Software in the host machine that can interpret both text and graphics input is used to capture the contents of the pen-computer. Optionally the contents of the pen computer can be erased. Erasure of memory can be restricted to the operator input stored from the current session, i.e. since the last time the apparatus was turned on.

In addition, there are two status indicator lights: (i) low battery condition, and (ii) low memory condition.

Alternative Embodiments

Figure 17:
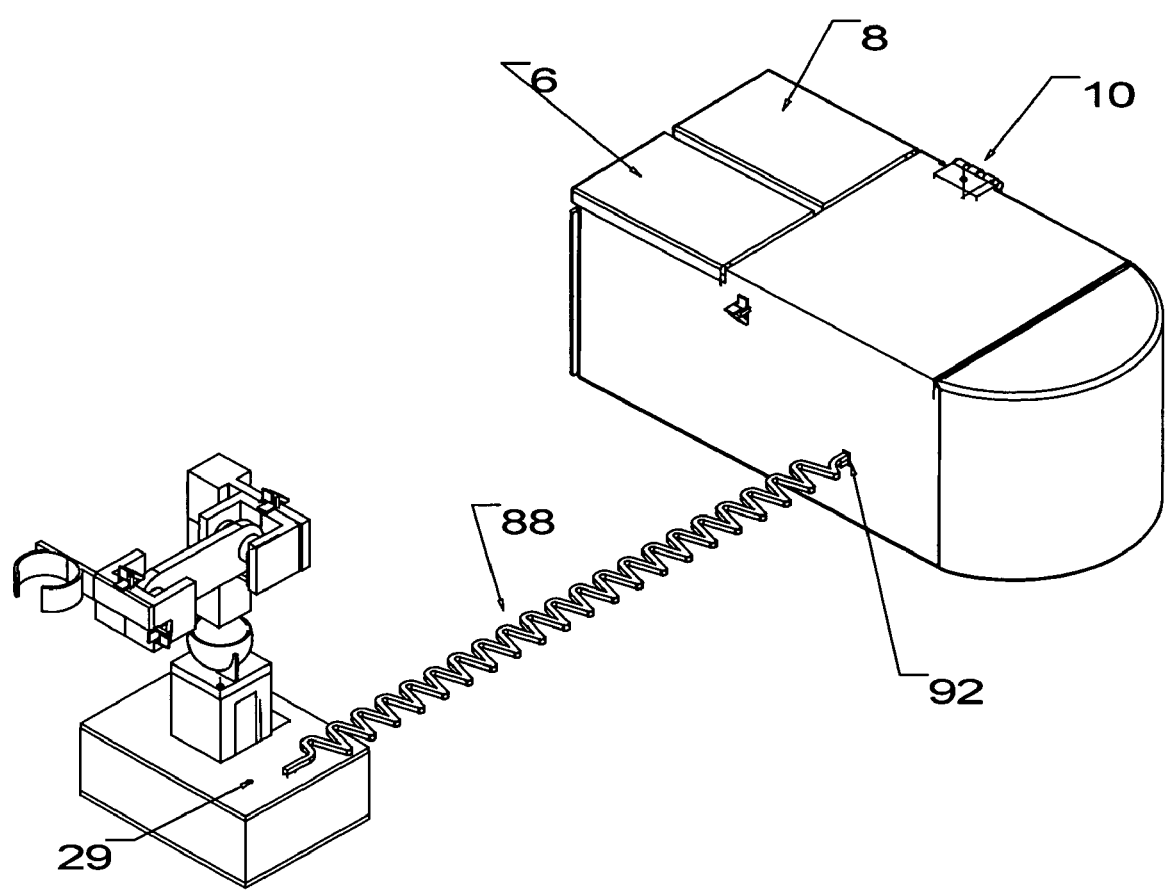
FIG. 17 shows another configuration of the apparatus in pen-input mode.

In an alternate configuration (FIG. 17), an additional sensor unit is used. To accommodate this, the following changes are done to the preferred embodiment:

A socket for electrical connection is configured on the processor unit and a corresponding hole 92 is made in the base portion of the mouse converter unit such that the socket is accessible from outside when the top cover of the mouse converter unit is closed.

The pen attachment unit and the sensor unit attached to it are removed from the mouse converter unit The sensor unit, placed outside, is electrically connected by a wire 88 to the processor unit through the newly configured electrical socket.

An auxiliary sensor unit is placed on the supports inside the mouse converter unit.

The auxiliary sensor unit is electrically connected to the processor unit.

The two sensor units are used as follows: the first sensor unit is used for pen-input operation and the auxiliary sensor unit, inside the mouse converter unit, is used to track mouse movements.

The processor unit is modified to accommodate receiving motion output from both the original sensor unit and the auxiliary sensor unit.

In this configuration, the device is used to switch between the mouse and pen-input modes without re-configuring the units or operating any switch. The processor unit decides which mode is being used by polling the motion outputs from both the sensor units and dynamically determining the mode of use.

Each of four types of units of the apparatus can be produced in alternate ways and some of the alternate configurations are described below.

In an alternate configuration of the mouse converter unit, the following modifications are made:

a scroll wheel is configured between the two buttons, as in commonly available mouse devices.

In several alternate configurations of the pen attachment unit, the following modifications are made:

In one alternate configuration, the mechanical attachment of the device to the object is not restricted to be placed near the tip as in the preferred embodiment. By varying the dimensions of the vertical portion of the unit, the attachment can be made higher up along the length of the object, away from the tip.

In another alternate configuration, the slider unit is modified as follows: a set of concentric interlocking shells is used to provide the sliding motion. The advantage of having several concentric cylindrical shells is that a maximum extension equal to sum of heights of all cylindrical shells is achieved, while the total height at rest is equal to one cylindrical shell.

In an alternate configuration, the pen-clip is alternately configured to be adjustable, similar to that found in clips used for household items, so that the same pen-clip can be rigidly attached to pens of different sizes.

In the processor unit, the following alterations are made:

In an alternate configuration, the processor unit is attached to the back end of the pen. For this purpose, a foldable insert is provided on the back surface of the processor unit. When placed inside the mouse converter unit, the insert is folded down along the back surface. It is positioned perpendicular to the back surface and snapped into place. The insert is shaped to receive a pen shape, so it can be attached to the back end of a pen.

In another alternate configuration, the electrical connection between the top cover of the mouse attachment unit and the processor unit is provided by flexible wires. The flexible wire connection replaces the two pairs of tall electrical contacts of the processor unit in the preferred embodiment.

In the sensor unit, the several modifications are possible and some of them are highlighted below.

In one alternate configuration, the imaging camera and processing chip and are moved to the processor unit housing. A flexible light conduit is used to transmit the light (reflected off the surface) from the sensor unit and to the camera and the processing chip, located in the processor unit.

Several alternative embodiments can be derived by using any sensor technology that works in a mouse device or a pen device. This includes, at the very least, the following sensing technologies: rollerball based, inertial, and optical technologies.

One such example is the use of roller-ball in the sensor unit, similar to that found in electromechanical mouse devices.

Another such example configuration concerns the use of accelerometers. In any pen-shaped device using accelerometers, in prior art, inclination changes of the pen is compensated by using additional sensing components which in turn reduces accuracy. However, when accelerometers are employed in the sensor unit described in the preferred embodiment, the extraneous motion is de-coupled by the pen attachment unit thereby avoiding the effects of changes in gravity component. This results in greater accuracy than that can be achieved without the use of pen attachment unit.

In addition to the modifications discussed thus far, the sensor unit and pen attachment unit can be configured differently to detect motion.

In an alternate embodiment, a two-axes accelerometer is used in addition to the optical arrangement stated in the preferred embodiment. The slider unit and the contact switch in the pen attachment unit are not necessary in this configuration. When the pen is lifted off the surface, the optical sensor stops detecting motion thereby behaving as a contact switch. During navigation motion, the output of inertial sensor is used to track the motion and this removes the need for a slider unit to keep the sensor on the surface. When the sensor unit touches the ground the optical sensor is again put to work.

Not only is it possible to modify units to perform existing functions, but new functional units can be derived from the units in the preferred embodiment. These new functional units clearly have applicability beyond the scope of the preferred embodiment.

The processing unit and the sensor unit can be part of same housing. This makes the device compact.

A simple but effective alternate configuration of the pen attachment unit is to use only the horizontal link.

There are many known pen-shaped devices in prior art for detecting motion which do not provide ink flow. The link in the pen attachment unit when attached to any such pen-shaped device is capable of enabling any pen-shaped object to provide user input using existing pen device technology. This configuration results in a rigid attachment of the pen to the sensor unit.

CONCLUSION, RAMIFICATIONS, AND SCOPE OF INVENTION

The disclosed invention overcomes the limitations noted in prior art and provides a low-cost combination device that serves three purposes: (i) as a mouse device, and (ii) as an "adapter" style device that can be attached to an ordinary pen-shaped object either (a) to capture operator input in real-time in pen-input mode or (b) for offline input and processing purposes in pen-computer mode.

The apparatus can employ the same motion sensing technology for the three modes: mouse-input mode, pen-input mode and pen-computer mode. The pen attachment unit performs the significant function of converting the low-cost optical technology, suitable for mouse-input, into one that can be used to provide pen-input.

In the pen-input and pen-computer modes the device can be attached to a wide variety of pen-shaped objects, whether the pen-shaped object produces relatively permanent imprint on a surface (e.g. ballpoint, regular pen, pencil, crayon) or not (e.g. stylus). The disclosed device does not require a special surface (e.g. tablet, touch-sensitive screen) to be used for capturing operator input. Such universal applicability allows the device to become a standard part of desktop or mobile or other computing environments in which operator input needs to be captured in real-time or during offline work.

The fact that the device can be attached to a variety of pen-shaped objects does not preclude making different versions of the device that are dedicated to specific pen-types or models. It is also easy to conceive of making this device specifically for use only in pen-input or pen-computer modes.

The embodiments stated herein show preference to specific technologies, based on accuracy of current generation of low-cost sensors. But the device can be configured in a number of other ways using technologies not explicitly stated herein.

For use of the device in pen-computer mode, it is also useful to add a display element. It is possible to add a small foldable display component to be attached to the processor unit. The display unit is useful to show the user provided input.

It is also possible to configure the processor unit in two parts: one that is electrically attached to the sensor unit and the other a base unit that connects to a host device. There can be wireless communication between the two parts of the processor unit. In this configuration, the display can be associated with the base unit of the processor unit, reducing the weight of the portion of the device potentially worn by the user.

Importantly, many post-processing options can be introduced before relaying the output from the processor unit to a host machine. For instance, there could be meta-characters that "mark up" the user input. The mark ups can specify application-specific information. For instance, the information entered by the user could be relevant for a few different applications. An address jotted down offline could be useful for an address book application whereas a piece of text could be relevant for a word processing application. At any rate, the use of "meta-characters" allows mark up of the user input and the processor unit can be modified to allow for processing such meta-characters.

Graphics input can be stored efficiently by approximating the user motion using graphics primitives (such as line, arc, circle, rectangle etc).

Additionally, this device can also be configured to integrate auxiliary information, such as from a stationary reference point, particularly during the uses in pen-input and pen-computer modes. When such stationary reference point is used with respect to a page of paper, the position of the digital output from this device can be positioned in relation to the dimensions of the page. This allows for continuity in using the same page of paper even when the device is turned off after a first pass of operator input and then turned back on to capture the second pass of operator input.

The means of auxiliary information is not restricted to using a stationary reference point. A miniature imaging camera can be mounted to the sensor unit that can provide valuable contextual information to position the operator input on a page. Alternately, a specially marked surface (e.g. paper with micro patterns) can be used to provide absolute coordinate information on a paper.

For those skilled in art, the various configurations in which the device can be made should be evident based on the discussions set forth herein.

The invention claimed is:

1. An apparatus comprising:
   a) at least one sensor unit having a motion detection means to detect its relative motion with respect to a surface,
   b) a processor unit including microcontroller, storage, power and communications elements,
   c) a mouse converter unit with a housing in the shape of a computer mouse,
   d) a pen attachment unit with a first attachable end and a second attachable end,
   e) said processor unit electrically connected to each of said sensor units,
   f) said mouse converter unit containing hollow space to receive one said sensor unit and said processor unit,
   g) a first mounting means to attach said first attachable to one said sensor unit, and
   h) a second mounting means to attach said second attachable end to a pen object,
   whereby said apparatus can be configured to operate as a mouse device by using one said sensor unit, said processor unit and said mouse converter unit, and as a pen device by using one said sensor unit, said processor unit and said pen attachment unit.

2. The apparatus of claim 1, said first mounting means comprising:
   a) a snap clip attached to said first attachable end,
   b) a receptacle for said snap clip attached to said sensor unit, and
   c) a hinge connecting said sensor unit and said first attachable end.

3. The apparatus of claim 1, said second mounting means comprising:
   a) a clip with a cross section matched to fit the cross section of said pen shaped object, on a plane perpendicular to the length of the pen object.

4. The apparatus of claim 1, said motion detection means comprising motion sensing arrangement found in conventional mouse input devices.

5. The apparatus of claim 1, said motion detection means comprising motion sensing arrangement found in digital pen devices.

6. The apparatus of claim 1, further comprising:
   a. said mouse converter unit formed by joining a base portion and a top cover portion,
   b. the bottom surface of said base portion having a hole,
   c. said top cover portion including a first mouse button and a second mouse button placed so as to be operated by fingertips,
   d. said base portion and the top cover of said mouse converter unit connected by the combination of a hinge and a snap clip so as to be able open and close said top cover portion,
   e. said base portion on the inside of said mouse converter unit having a first set of supports and a second set of supports,
   f. one said sensor unit firmly held by said first set of supports so as to enable said sensor unit to have access to said surface,
   g. said processor unit firmly held in place by said second set of supports,
   h. said mouse converter unit buttons electrically connected to said processor unit when said processor unit is placed within said mouse converter unit,
   i. said first mounting means comprising a hinge connecting said sensor unit and said first attachable end, and
   j. a compacting means to reduce the volume occupied by said pen attachment unit,
whereby said sensor unit, said processor unit and a folded form of said pen attachment unit can be fully contained within said mouse converter unit housing and said apparatus can be operated as a computer mouse device.

7. The apparatus of claim 6, said compacting means comprising:
   a. said pen attachment unit having a vertical element,
   b. said pen attachment unit having a horizontal element, and
   c. a hinge connecting said vertical element and said horizontal element,
whereby said vertical element and said horizontal element can be folded with respect to each other.

8. The apparatus of claim 1, further comprising:
   a. said pen attachment unit including a mechanical coupling means to selectively transfer motion between said second attachable end and said first attachable end,
   b. said pen attachment unit including a navigation motion detection means to identify presence of relative movement, between said second attachable end and first attachable end, in the direction of normal to said surface,
   c. said processor unit having plurality of stands attached to the bottom surface, and
   d. an elastic strap inserted through slits in said stands,
whereby said apparatus can be operated as a pen device by (i) positioning the tip of said pen object on said surface, (ii) placing the bottom surface of said sensor unit on said surface, (iii) wearing the processor unit on the back of the palm of hand by inserting palm of hand into said elastic strap and (iv) moving said tip on or above said surface.

9. The apparatus of claim 8, said mechanical coupling means, navigation motion detection means, object fitting means and sensor fitting means together comprising:
   a. a vertical element having:
      i. a slider unit with a stationary component and a moveable component,
      ii. the base portion, of said stationary part forming the second attachable end of the pen attachment unit,
      iii. said base portion having an electricity conducting strip,
      iv. a spherical joint with a protrusion,
      v. a vertical arm attached to said protrusion,
      vi. a first connector attached to the top portion of said vertical arm by a hinge, and
      vii. said spherical joint fixed on the top surface of said moveable part of said slider unit,
   b. a horizontal element having:
      i. a link,
      ii. a clip, and
      iii. said link and said clip connected by a second connector,
   c. said vertical element and said horizontal element linked by a first connector,
   d. said base portion of said stationary part of said slider unit attached to said top surface of said sensor unit by a hinge, and
   e. said base portion of said stationary part of said slider unit having a snap clip aligned with said snap clip receptacle on the top surface of said sensor unit,
whereby (i) the motion component of said object tip on said surface or on a parallel plane above said surface results in proportional movement of said sensor unit on said surface, and (ii) the motion component of said object tip along the normal axis of said surface is not transferred onto said sensor unit, and (iii) the length dimension of said pen object is allowed to be placed at any inclination with respect to said surface.

10. The apparatus of claim 8, further comprising:
    a. a push button to operate the device as a pen computer, and
    b. a push button to initiate communication with said host device,
whereby said apparatus processes and stores user input with capability to synchronize with a host device on demand.

11. A method of operator interaction, using an apparatus, comprising the steps of
    a. detecting relative motion with respect to a surface using a sensor arrangement found in mouse devices
    b. determining mode of operation of said apparatus to be mouse mode when there is no external mechanical arrangement attached to said sensor arrangement
    c. allowing attachment of a mechanical arrangement to said sensor arrangement and simultaneously allowing attachment of said mechanical arrangement to a pen object,
    d. moving said sensor arrangement in response to movement of tip of said pen object on said surface or on a plane parallel to and above said surface,
    e. determining mode of operation of said apparatus to be pen mode when said mechanical arrangement is attached to said sensor arrangement,
    f. allowing inclination of said pen object with respect to said surface, by employing a spherical joint in said mechanical arrangement,
    g. allowing said pen object to be lifted off said surface while keeping the relative motion detection arrangement proximal to said surface, using a slider arrangement in said mechanical arrangement, h. detecting when said pen object is lifted off said surface by identifying movement of a sliding component within said slider arrangement, i. calculating cumulative amount of relative motion, j. classifying detected motion as navigational motion when said pen object is lifted off said surface, and k. indicating to said host device by means of an additional signal the presence of said navigational motion.

12. The method of claim 11, further comprising step of:
a. communicating periodically the calculated motion to a host device.

13. The method of claim 11, further comprising the steps of;
a. processing the calculated relative motion,
b. storing the processed motion, and
c. transferring stored motion to a host device when a button is pressed.

\* \* \* \* \*